US007637536B2

(12) United States Patent
Delventhal et al.

(10) Patent No.: US 7,637,536 B2
(45) Date of Patent: Dec. 29, 2009

(54) RETRACTOR HAVING MECHANISMS FOR DISABLING A VEHICLE SENSITIVE SENSOR AND FOR PREVENTING WEBBING WITHDRAWAL

(75) Inventors: Neal H. Delventhal, Lake Orion, MI (US); Scott M. Franz, Clawson, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 244 days.

(21) Appl. No.: 11/384,802

(22) Filed: Mar. 20, 2006

(65) Prior Publication Data

US 2007/0216214 A1 Sep. 20, 2007

(51) Int. Cl.
*B60R 22/46* (2006.01)

(52) U.S. Cl. .................. 280/806; 297/478; 297/476; 242/383.2

(58) Field of Classification Search ... 242/383.1–383.4, 242/384.6; 297/476, 478–479; 280/806, 280/807
See application file for complete search history.

(56) References Cited

U.S. PATENT DOCUMENTS

| | | | |
|---|---|---|---|
| 3,790,098 A | 2/1974 | Lewis | |
| 5,169,085 A | 12/1992 | Kalbantner et al. | |
| 5,495,994 A * | 3/1996 | Rumpf et al. | 242/384.4 |
| 5,505,400 A | 4/1996 | Boelstler et al. | |
| 5,669,573 A | 9/1997 | Hirzel | |
| 5,695,146 A | 12/1997 | Schmidt et al. | |
| 5,716,102 A | 2/1998 | Ray et al. | |
| 5,794,879 A | 8/1998 | Huber | |
| 5,826,813 A | 10/1998 | Hibata | |
| 5,882,084 A | 3/1999 | Verellen et al. | |
| 6,068,341 A | 5/2000 | Rink | |
| 6,152,393 A | 11/2000 | Ando et al. | |
| 6,186,431 B1 | 2/2001 | Biller et al. | |
| 6,302,489 B1 * | 10/2001 | Coppo | 297/478 |
| 6,578,419 B1 * | 6/2003 | Murayama | 73/493 |
| 6,923,506 B2 | 8/2005 | Tanabe et al. | |
| 7,090,304 B2 * | 8/2006 | Delventhal et al. | 297/478 |
| 2005/0133652 A1 | 6/2005 | Kielwein | |
| 2006/0012237 A1 | 1/2006 | Delventhal et al. | |

FOREIGN PATENT DOCUMENTS

DE 4032157 7/1991
DE 29720818 4/1998

* cited by examiner

*Primary Examiner*—Paul N Dickson
*Assistant Examiner*—Drew Brown
(74) *Attorney, Agent, or Firm*—Tarolli, Sundheim, Covell & Tummino LLP

(57) ABSTRACT

A seat belt retractor (40) associated with a seat (10) includes a spool (106) about which seat belt webbing (42) is wound. The spool (106) is supported for rotation in a belt withdrawal direction and in an opposite belt retraction direction. A vehicle sensitive sensor (190) is responsive to at least one sensed vehicle condition for preventing rotation of the spool (106) in the belt withdrawal direction. A first mechanism (206) is responsive to a first condition for disabling the vehicle sensitive sensor (190). A second mechanism (294) is responsive to a second, different condition for preventing rotation of the spool (106) in the belt withdrawal direction. The second condition is a condition of the associated seat (10). In one embodiment, a third mechanism (400) is responsive to the first condition for allowing rotation of the spool (106) in the belt withdrawal direction.

28 Claims, 14 Drawing Sheets

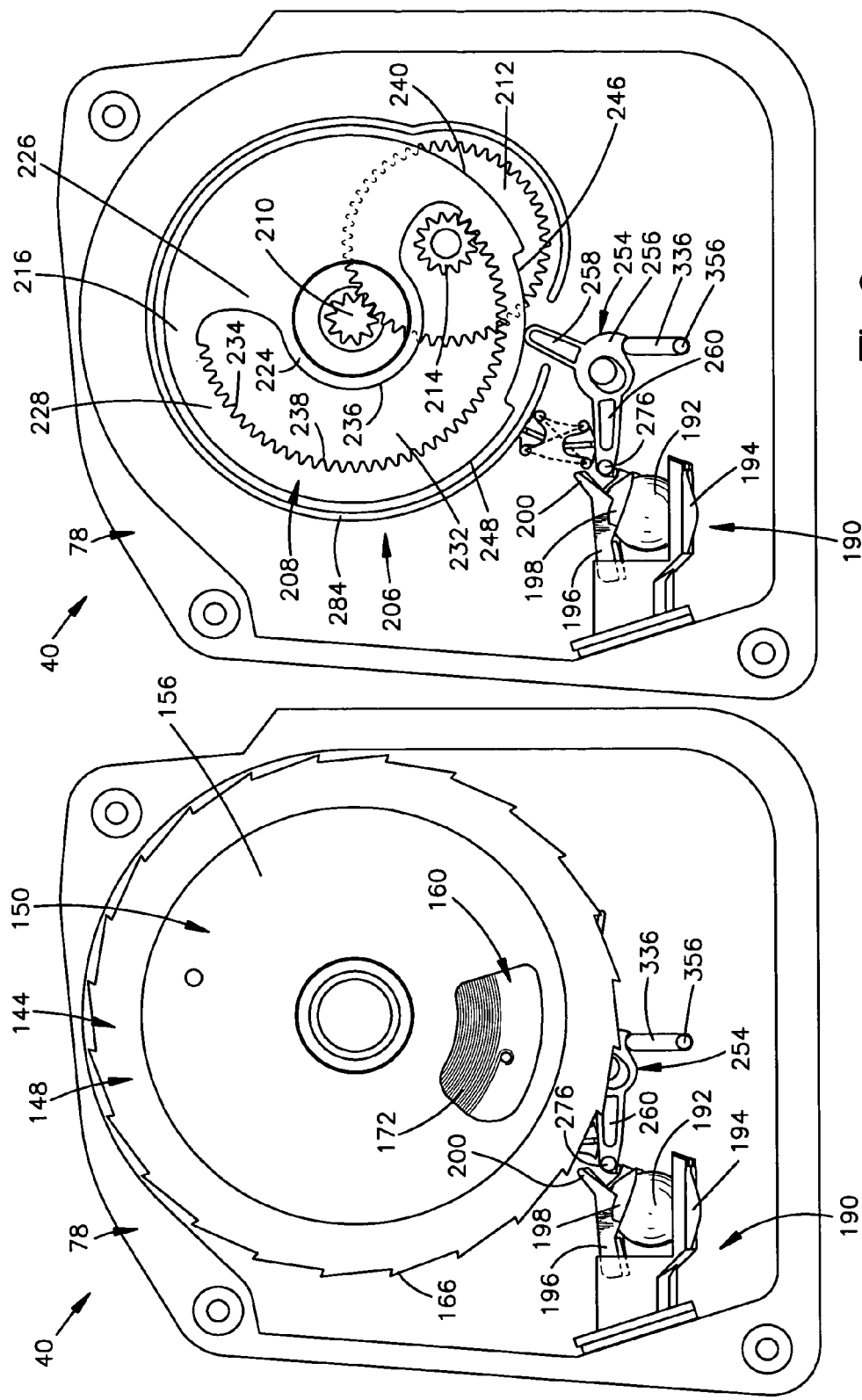

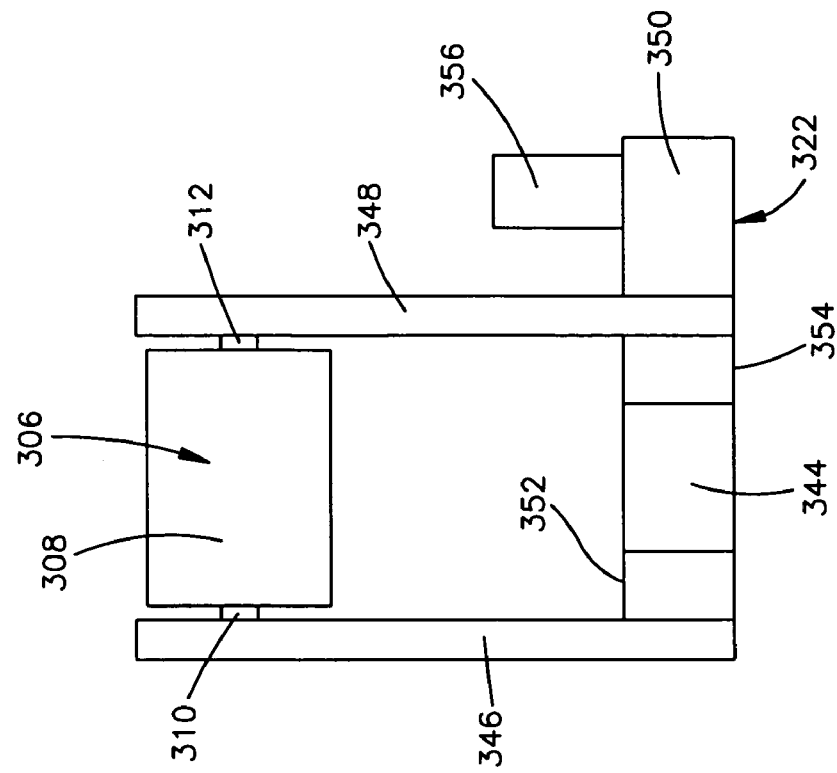
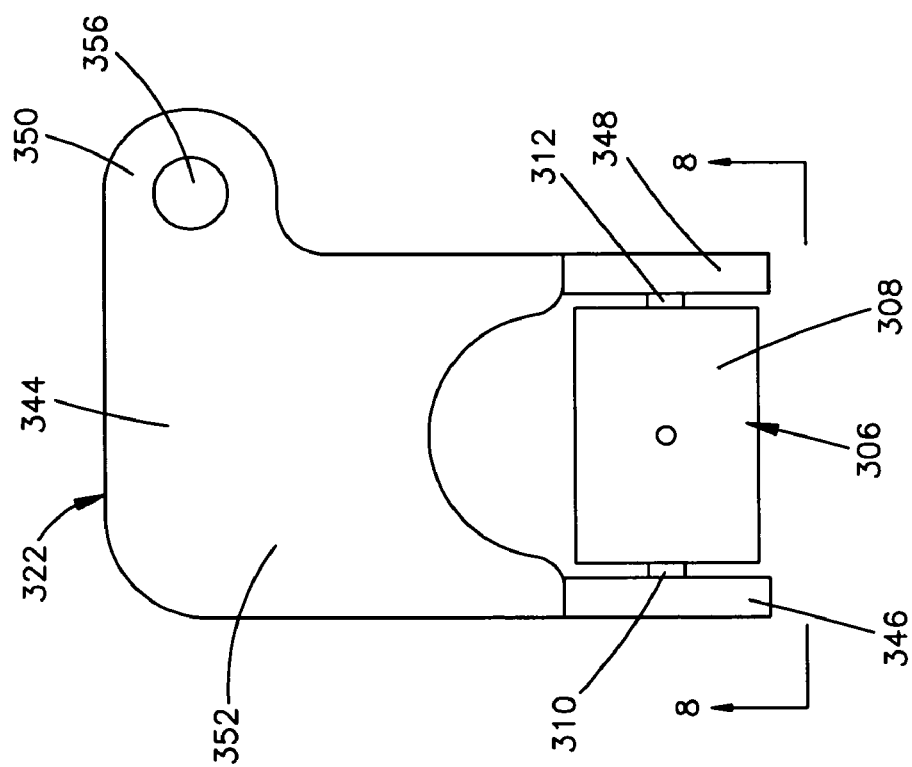

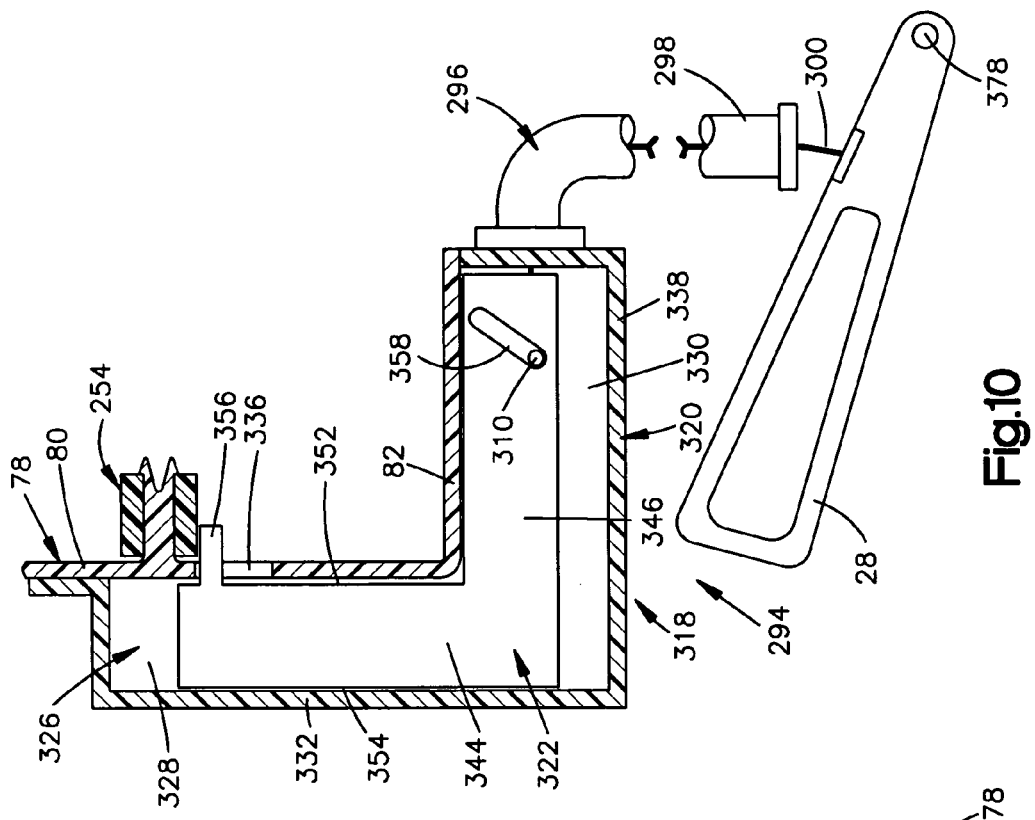
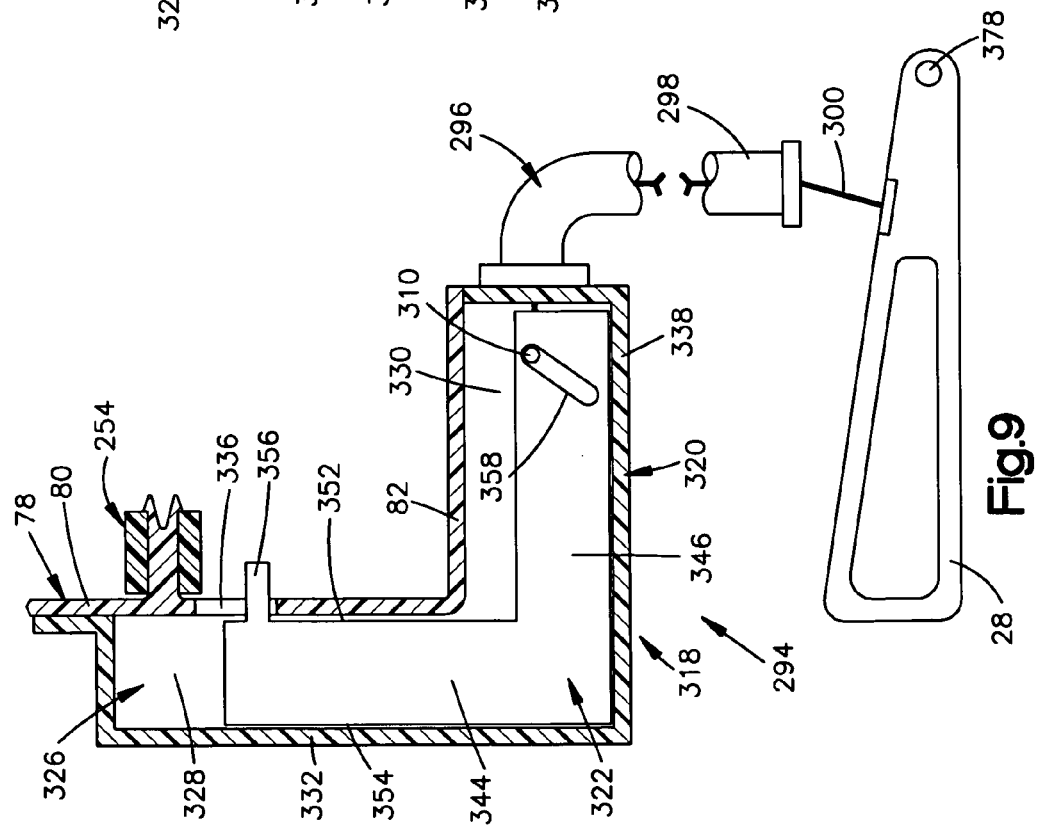

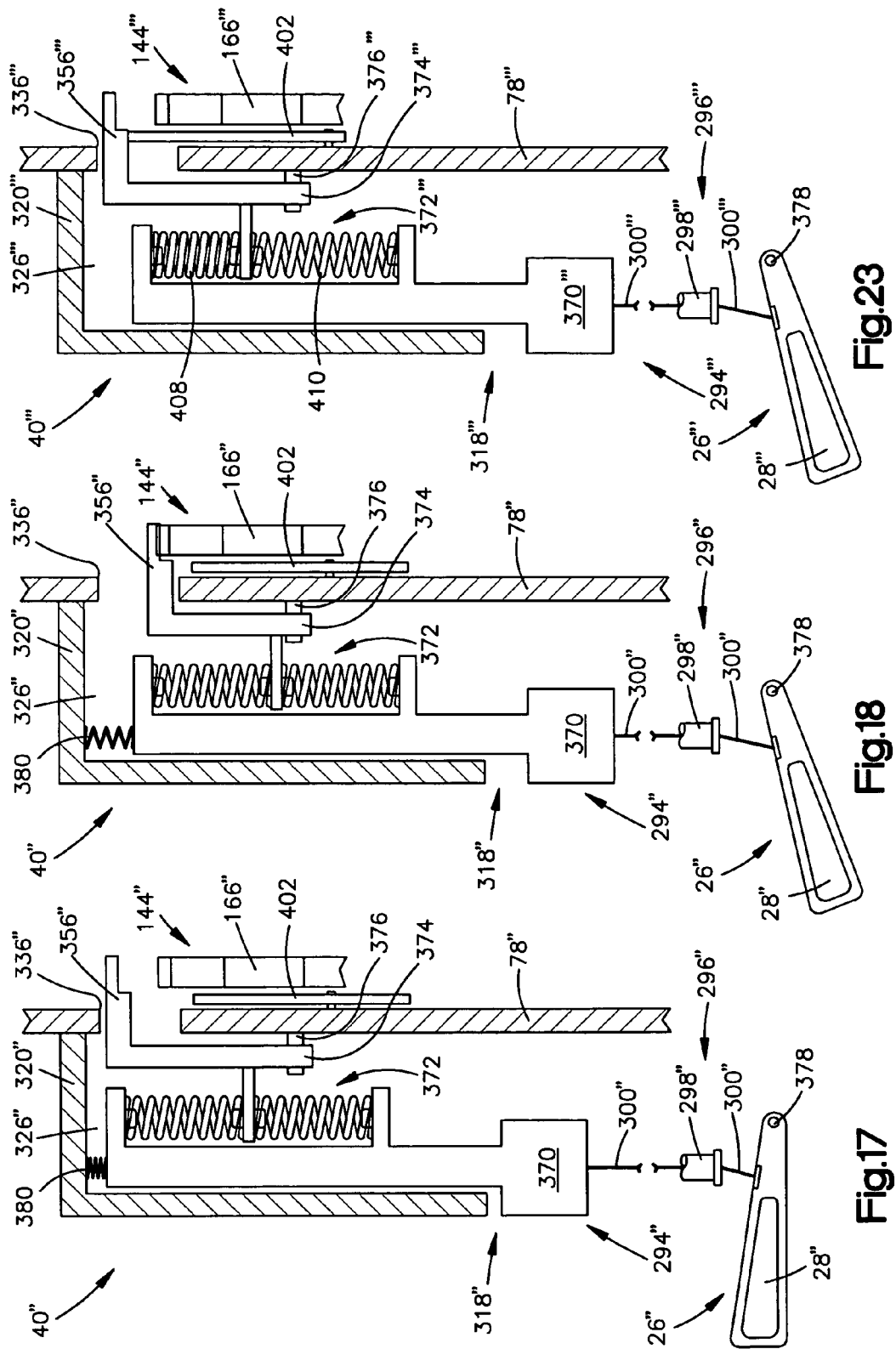

RETRACTOR HAVING MECHANISMS FOR DISABLING A VEHICLE SENSITIVE SENSOR AND FOR PREVENTING WEBBING WITHDRAWAL

TECHNICAL FIELD

The present invention relates to a retractor for a vehicle seat belt system. More particularly, the present invention relates to a retractor that includes both a mechanism for disabling a vehicle sensitive sensor and a mechanism for preventing seat belt webbing withdrawal from the retractor when a seat back latch mechanism is in an unlatched condition.

BACKGROUND OF THE INVENTION

Many vehicle seat belt retractors include a vehicle sensitive sensor. The vehicle sensitive sensor is responsive to certain vehicle conditions, such as vehicle deceleration and tilt, for preventing rotation of a spool of the retractor in a belt withdrawal direction.

It is common in some types of vehicles to locate the seat belt retractor in the backrest portion of the seat. When a seat belt retractor that is mounted in the backrest portion of the seat includes a vehicle sensitive sensor, the reclining or folding of the backrest portion of the seat may result in the vehicle sensitive sensor preventing rotation of the spool in a belt withdrawal direction. The spool of the retractor, however, may still rotate in the belt retraction direction to retract seat belt webbing. If the seat belt webbing retracts into the retractor when the backrest portion of the seat is in a folded condition and the vehicle sensitive sensor prevents rotation of the spool in the belt withdrawal direction, the seat belt webbing is prevented from being withdrawn from the retractor. As a result, the seat belt webbing may prevent the backrest portion of the seat from being returned to an upright position.

In some known seat belt systems, a button is sewn onto the seat belt webbing at a predetermined location. When the backrest portion of the seat is in an upright position and the seat belt webbing is fully retracted, the button on the seat belt webbing engages a structure within the retractor for preventing further retraction of the seat belt webbing. When the backrest portion of the seat is folded, no further seat belt webbing may be retracted into the retractor. Since the distance between the retractor and the anchor for the seat belt webbing is shortened when the backrest portion of the seat is folded, a loose portion of the seat belt webbing is formed when the backrest portion of the seat is folded. This loose portion of the seat belt webbing may hang to the side of the seat and is subject to damage from events such as being closed in the vehicle door.

A mechanism for disabling the vehicle sensitive sensor under certain conditions, such as a folded condition of the backrest portion of the seat, is desired. Such a mechanism, however, should not hinder the proper operation of the vehicle sensitive sensor when the seat belt webbing is being used for restraining an occupant in a vehicle seat.

A vehicle seat generally includes a seat back latch mechanism that must be moved to an unlatched condition for enabling the backrest portion of the seat to be folded or reclined relative to the seat cushion. When the seat back latch mechanism is in the latched condition, the backrest portion of the seat is fixed relative to the cushion portion of the seat. When the seat belt retractor is located in the backrest portion of the seat, the seat back latch mechanism must be in the latched condition for the seat belt webbing to help restrain the forward movement of the torso of the occupant of the seat. If the seat back latch mechanism is in the unlatched condition during the occurrence of a vehicle crash event, the backrest portion of the seat will move with the torso of the occupant and the seat belt webbing will not restrain movement of the torso.

It is desirable to prevent an occupant from withdrawing seat belt webbing from the seat belt retractor until the seat back latch mechanism is in the latched condition. By preventing the withdrawal of the seat belt webbing until the seat back latch mechanism is in the latched condition, the occupant will be forced to place the seat back latch mechanism in the latched condition prior to withdrawing and buckling the seat belt webbing. As a result of the seat back latch mechanism being placed in the latched condition to fix the backrest portion of the seat relative to the cushion portion, the seat belt webbing may help to restrain movement of the torso of the occupant.

SUMMARY OF THE INVENTION

The present invention relates to a seat belt retractor that is associated with a seat of a vehicle. The retractor comprises a spool about which seat belt webbing is wound. The spool is supported for rotation in a belt withdrawal direction and in an opposite belt retraction direction. The retractor also comprises a vehicle sensitive sensor that is responsive to at least one sensed vehicle condition for preventing rotation of the spool in the belt withdrawal direction. The retractor further comprises first and second mechanisms. The first mechanism is responsive to a first condition for disabling the vehicle sensitive sensor. The second mechanism is responsive to a second, different condition for preventing rotation of the spool in the belt withdrawal direction. The second condition is a condition of the associated seat.

According to another aspect, the present invention relates to a seat belt retractor for mounting within a backrest portion of a seat of a vehicle. The backrest portion of the seat is movable relative to a cushion portion when a seat back latch mechanism is in an unlatched condition. The retractor comprises a spool about which seat belt webbing is wound. The spool is supported for rotation in a belt withdrawal direction and in an opposite belt retraction direction. The retractor also comprises a vehicle sensitive sensor that is responsive to at least one sensed vehicle condition for preventing rotation of the spool in the belt withdrawal direction. The retractor further comprises first and second mechanisms. The first mechanism is responsive to seat belt webbing being wound onto the spool to a nearly fully retracted condition for disabling the vehicle sensitive sensor. The second mechanism is responsive to the seat back latch mechanism being in the unlatched condition for preventing rotation of the spool in the belt withdrawal direction.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is a sectional side view illustrating a first portion of the retractor of FIG. 1;

FIG. 6 is a sectional side view illustrating a second portion of the retractor of FIG. 1 in a condition in which the seat belt webbing is in a fully retracted condition;

FIG. 7 is a view of a portion of a slider assembly of the retractor of FIG. 1;

FIG. 8 is a view taken along line 8-8 in FIG. 7;

FIG. 9 is an enlarged view of a mechanism of the retractor of FIG. 1 in a first condition;

FIG. 10 is an enlarged view of the mechanism of FIG. 9 in a second condition;

FIG. 17 is an enlarged view of a mechanism of the retractor of FIG. 14 in a first condition;

FIG. 18 is an enlarged view of the mechanism of FIG. 17 in a second condition;

FIG. 23 is an enlarged view of a mechanism of the retractor of FIG. 19 in one condition.

DETAILED DESCRIPTION OF THE INVENTION

Figure 1:
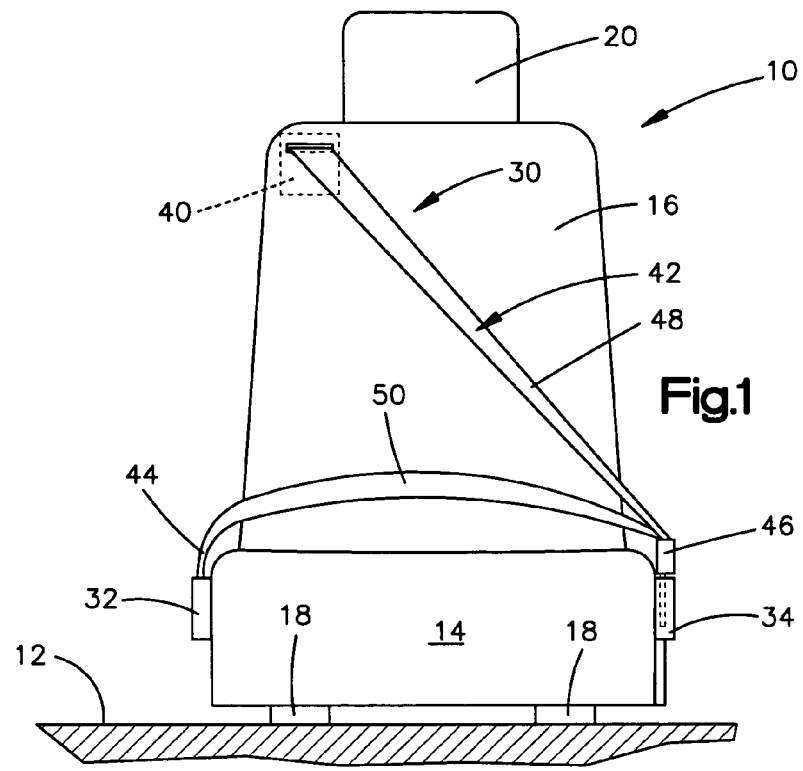
FIG. 1 is a schematic illustration of a seat belt system associated with a seat of a vehicle and including a seat belt retractor constructed in accordance with the present invention.

FIG. 1 illustrates a seat 10 of a vehicle 12. The seat 10 includes a cushion portion 14 and a backrest portion 16. The cushion portion 14 of the seat 10 is mountable to the vehicle 12 through rails 18. The rails 18 support the cushion portion 14 of the seat 10 relative to the vehicle 12 and enable forward and rearward movement of the cushion portion relative to the vehicle. The backrest portion 16 of the seat 10 extends upwardly from the cushion portion 14. A headrest portion 20 of the seat 10 is located above the backrest portion 16.

Figure 2:
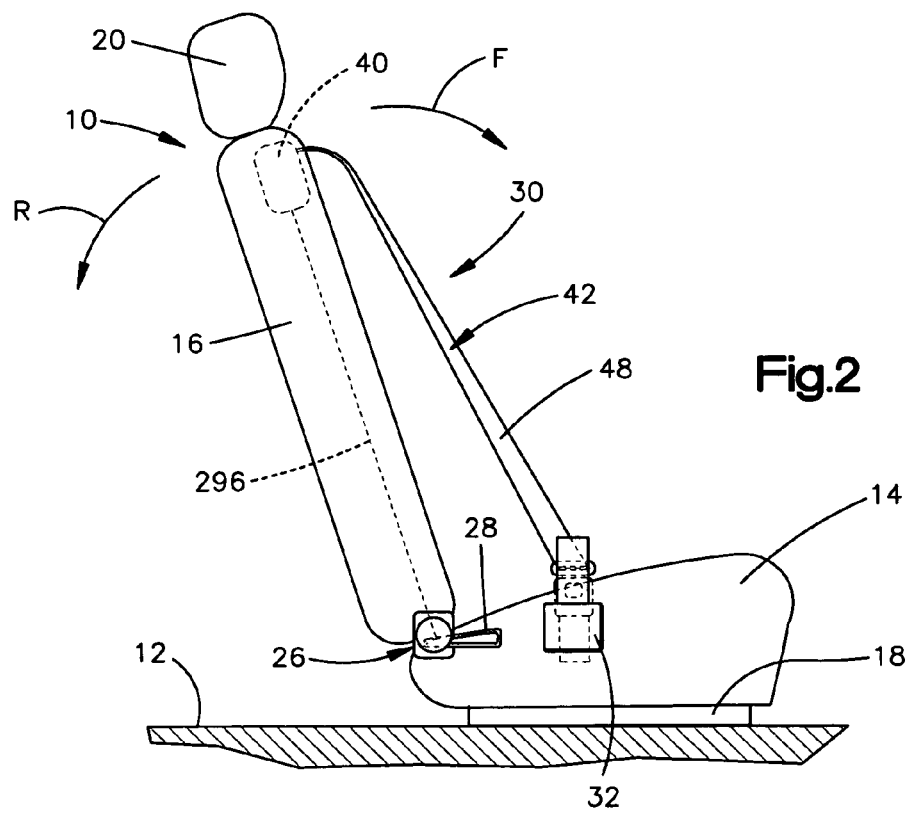
FIG. 2 is a schematic side view of the seat illustrated in FIG. 1.

A pivot mechanism (not shown) pivotally attaches the backrest portion 16 of the seat 10 to the cushion portion 14 of the seat. The pivot mechanism enables pivotal movement of the backrest portion 16 of the seat 10 relative to the cushion portion 14 of the seat in both forward and rearward directions. FIG. 2 illustrates the backrest portion 16 in an upright condition. When the backrest portion 16 is pivoted in the forward direction, shown by arrow F in FIG. 2, from the upright condition, the seat 10 is placed in a folded condition. Folding seats are common in vehicles such as minivans. When the backrest portion 16 is pivoted in the rearward direction, shown by arrow R in FIG. 2, from the upright condition, the seat 10 is placed in a reclined condition.

The pivot mechanism includes a latch mechanism 26 that is movable between latched and unlatched conditions. FIG. 2 illustrates a handle 28 of the latch mechanism 26. When the latch mechanism 26 is in the latched condition, the backrest portion 16 of the seat 10 is fixed relative to the cushion portion 14 of the seat. When the latch mechanism 26 is in the unlatched condition, the backrest portion 16 of the seat 10 is pivotable relative to the cushion portion 14 of the seat. To move the latch mechanism 26 between the latched and unlatched conditions, the handle 28 is moved relative to the cushion portion 14 of the seat 10. When the handle 28 is in the position shown in FIG. 2, the latch mechanism 26 is in the latched condition. When the handle 28 is pulled upwardly from the position shown in FIG. 2, the latch mechanism 26 is in the unlatched condition.

FIGS. 1 and 2 also illustrate a seat belt system 30 that is associated with the seat 10 of a vehicle 12. The seat belt system 30 is a three-point continuous loop seat belt system and is connected with the seat 10. The seat belt system 30 includes an anchor 32 that is secured to the left side, as viewed in FIG. 1, of the cushion portion 14 of the seat 10. A buckle assembly 34 is secured to the right side, as viewed in FIG. 1, of the cushion portion 14 of the seat 10. The seat belt system 30 also includes a seat belt webbing retractor 40 constructed in accordance with the present invention. The retractor 40 is mounted within the backrest portion 16 of the seat 10 at a location adjacent the left side of the seat, as viewed in FIG. 1.

The seat belt system 30 also includes a length of seat belt webbing 42. A first end 44 (FIG. 1) of the seat belt webbing 42 is secured to the anchor 32. A second end (not shown) of the seat belt webbing 42 is fixed to the retractor 40. A tongue assembly 46 is located on the seat belt webbing 42 between the retractor 40 and the anchor 32. The tongue assembly 46 is movable along the seat belt webbing 42.

When the seat belt system 30 is not is use, the seat belt webbing 42 is oriented generally vertically between the retractor 40 and the anchor 32. To engage the seat belt system 30, the tongue assembly 46 is manually grasped and is pulled across the occupant of the seat 10. As the tongue assembly 46 is pulled across the occupant, the tongue assembly 46 moves along the seat belt webbing 42 and seat belt webbing is withdrawn from the retractor 40. The movement of the tongue assembly 46 across the occupant pulls the seat belt webbing 42 across the lap and torso of the occupant. After the seat belt webbing 42 has been pulled across the lap and torso of the occupant, the tongue assembly 46 is inserted into the buckle assembly 34 and is latched in the buckle assembly. When the tongue assembly 46 is latched in the buckle assembly 34, the seat belt webbing 42 is in the position shown in FIG. 1.

When the tongue assembly 46 is latched in the buckle assembly 34, the tongue assembly 46 divides the seat belt webbing 42 into a torso portion 48 and a lap portion 50 (FIG. 1). The torso portion 48 of the seat belt webbing 42 extends between the retractor 40 and the tongue assembly 46 and extends across the torso of the occupant of the seat 10. The lap portion 50 of the seat belt webbing 42 extends between the tongue assembly 46 and the anchor 32 and extends across the lap of the occupant of the seat 10.

Figure 3:
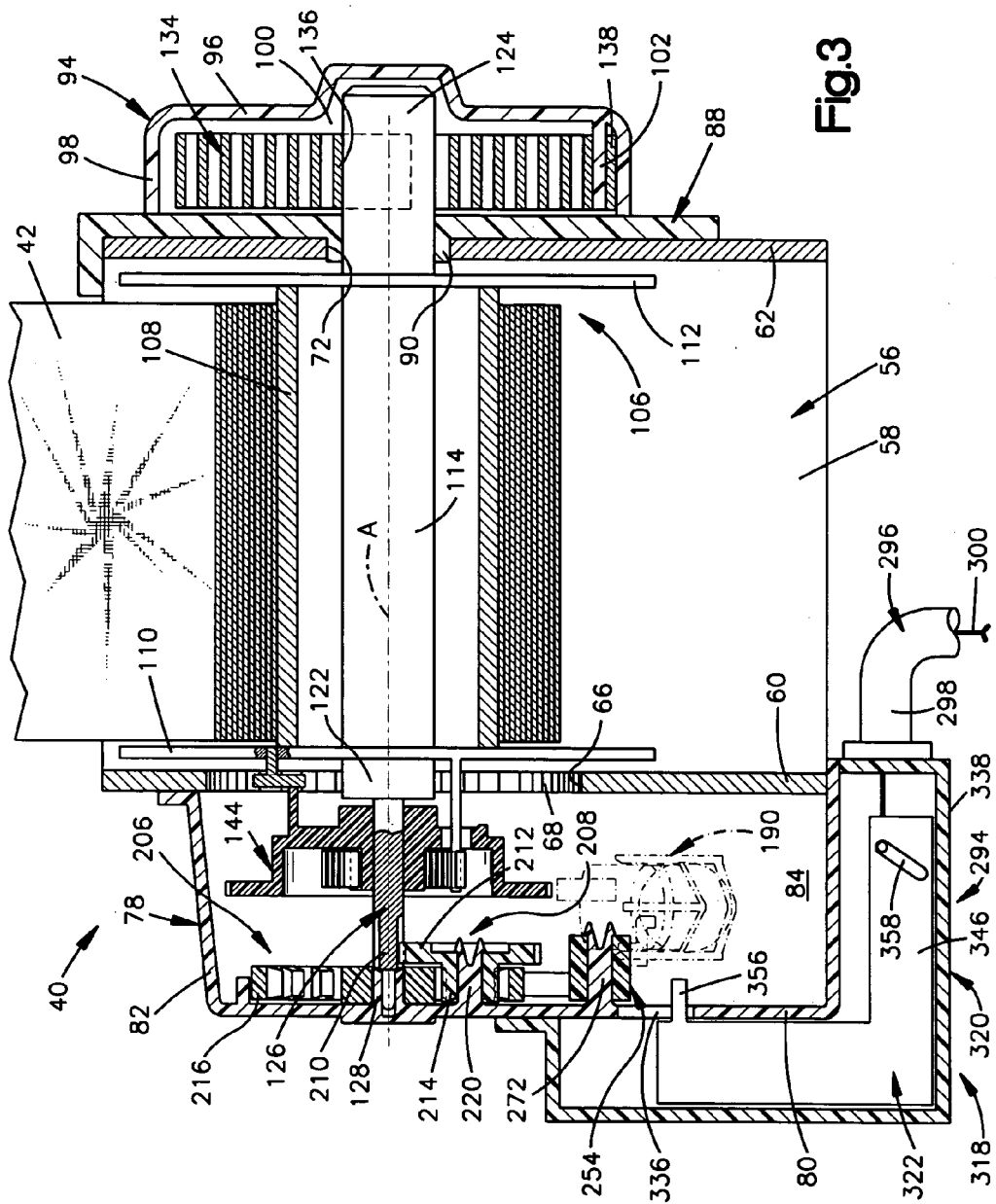
FIG. 3 is a schematic sectional view of the retractor of FIG. 1.

FIG. 3 is a schematic sectional view of the retractor 40 of FIG. 1. The retractor 40 includes a U-shaped frame 56. The frame 56 is stamped from a single piece of sheet metal and includes a base wall 58 and opposite first and second side walls 60 and 62, respectively. The first and second side walls 60 and 62 extend perpendicularly from the base wall 58. The base wall 58 of the frame 56 includes an aperture (not shown) for receiving a fastener (not shown) for fixing the retractor 40 to the backrest portion 16 of the seat 10.

A large diameter opening 66 extends through the first side wall 60 of the frame 56. Ratchet teeth 68 are formed on the first side wall 60. The ratchet teeth 68 extend radially inwardly into the opening 66. A smaller diameter opening 72 extends through the second side wall 62 of the frame 56. The openings 66 and 72 in the first and second side walls 60 and 62 are coaxial and are centered on axis A, as shown in FIG. 3.

A cover 78 is attached to the first side wall 60 of the frame 56 on a side of the first side wall facing away from the second side wall 62. The cover 78 includes an end wall 80 that extends radially relative to axis A and an outer wall 82 that extends generally parallel to axis A. A chamber 84 is formed between the cover 78 and the first side wall 60 of the frame 56.

A plastic bearing member 88 is affixed to the second side wall 62 of the frame 56 on a side of the second side wall facing away from the first side wall 60. The bearing member 88 includes a cylindrical flange portion 90 that extends generally parallel to axis A and through the opening 72 in the second side wall 62 of the frame 56.

A cover 94 is attached to the bearing member 88. The cover 94 includes an end wall 96, which extends radially relative to axis A, and a cylindrical outer wall 98. A chamber 100 is formed between the cover 94 and the bearing member 88. A projection 102 extends axially into the chamber 100 from the end wall 96 of the cover 94 at a location adjacent the outer wall 98.

The retractor 40 also includes a spool 106. The spool 106 includes a generally cylindrical webbing receiving portion 108, first and second webbing guides 110 and 112, respectively, and a central axle 114. The second end of the seat belt webbing 42 is fixed to the webbing receiving portion 108 of the spool 106 and a portion of the seat belt webbing 42 adjacent the second end is wound about the webbing receiving portion 108 of the spool 106. The webbing receiving portion 108 of the spool 106 is interposed between the first and second webbing guides 110 and 112. The first and second webbing guides 110 and 112 help to guide the seat belt webbing 42 onto the webbing receiving portion 108 of the spool 106 in an orderly manner.

A cylindrical post 118 (FIG. 4) extends axially away from the first webbing guide 110 in a direction opposite to the webbing receiving portion 108 of the spool 106. The cylindrical post 118 is spaced radially away from the central axle 114 of the spool 106. When the webbing receiving portion 108 of the spool 106 is positioned between the first and second side walls 60 and 62 of the frame 56, as is shown in FIG. 3, the cylindrical post 118 extends through the opening 66 in the first side wall of the frame 56 in a location spaced radially away from axis A.

Figure 4:
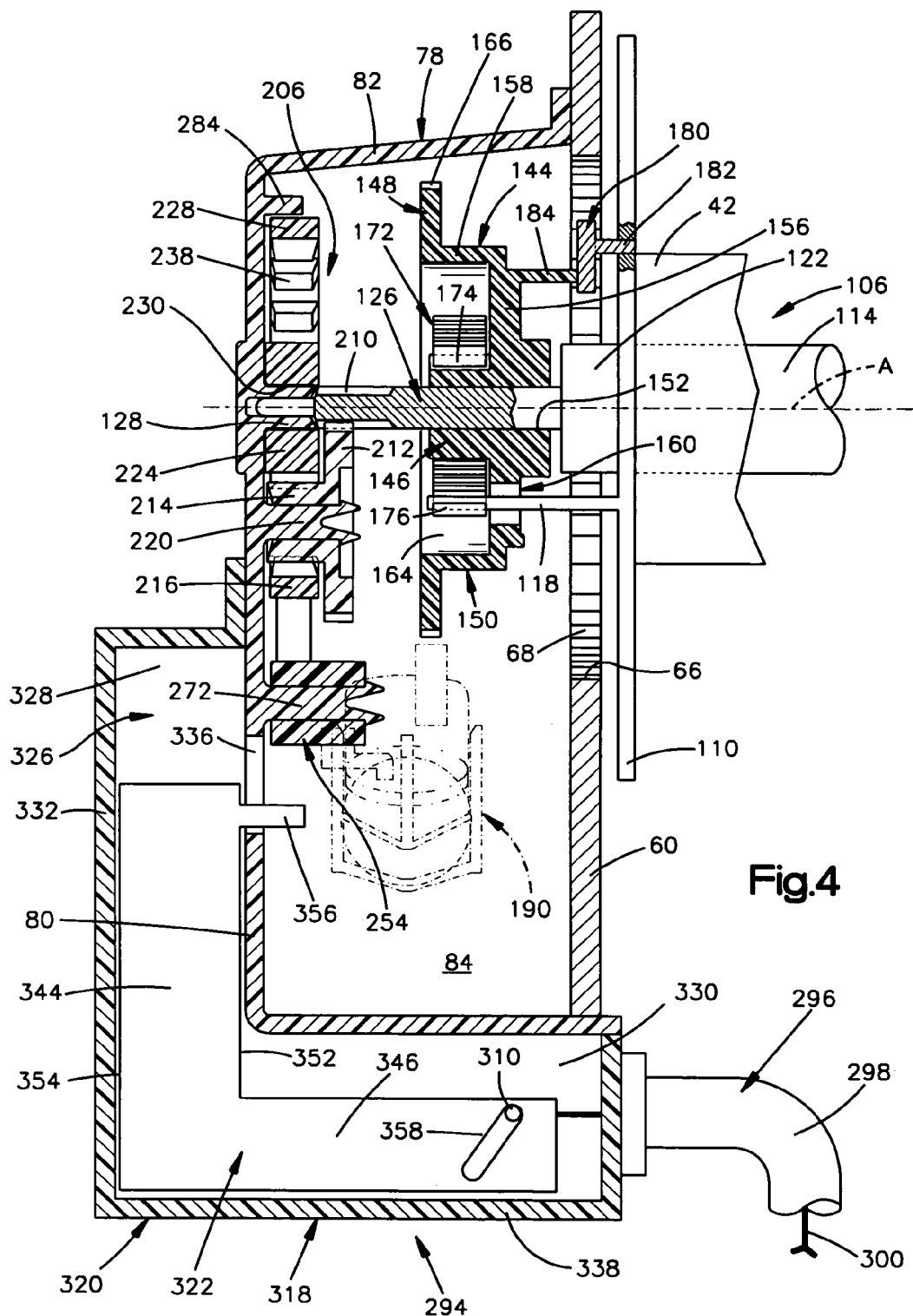
FIG. 4 is an enlarged view of a portion of the retractor of FIG. 3.

The central axle 114 of the spool 106 extends through the webbing receiving portion 108 of the spool and is fixed for rotation with the webbing receiving portion and the first and second webbing guides 110 and 112. The central axle 114 includes opposite first and second ends 122 and 124 (FIG. 3), respectively. The first end 122 of the central axle 114 extends outwardly of the first webbing guide 110 and through the opening 66 in the first side wall 60 of the frame 56. A cylindrical shaft 126 is affixed to the first end 122 of the central axle 114 and extends axially outwardly of the first end. Alternatively, the shaft 126 and the central axle 114 may be a one-piece unit and not separate pieces secured together. The shaft 126 is coaxial with the central axle 114 and has a diameter that is approximately one-third the diameter of the central axle. As is shown in FIG. 4, the shaft 126 is rotatably supported within a tubular protrusion 128 that extends into the chamber 84 from the end wall 80 of the cover 78.

As is shown in FIG. 3, the second end 124 of the central axle 114 extends outwardly of the second webbing guide 112 and through the opening 72 in the second side wall 62 of the frame 56. The cylindrical flange portion 90 of the bearing member 88 rotatably supports the second end 124 of the central axle 114. A bearing member (not shown) formed on the interior surface of end wall 96 may replace the flange portion 90 of the bearing member 88 for rotatably supporting the second end 124 of the central axle 114.

The spool 106 is rotatable relative to the frame 56 about the central axle 114. An axis of rotation of the spool 106 is located on axis A. The spool 106 is rotatable in a belt retraction direction and in an opposite belt withdrawal direction.

The retractor 40 also includes a rewind spring 134 (FIG. 3). The rewind spring 134 is located within the chamber 100. The rewind spring 134 is a spiral or clock spring and has inner and outer ends 136 and 138, respectively. The inner end 136 of the rewind spring 134 is affixed to the second end 124 of the central axle 114 of the spool 106. The outer end 138 of the rewind spring 134 is affixed to the projection 102 that extends axially into the chamber 100 from the end wall 96 of the cover 94. The rewind spring 134 biases the spool 106 for rotation in the belt retraction direction.

The retractor 40 also includes an actuator disk 144. As shown in FIG. 4, the actuator disk 144 includes a hub portion 146, an annular flange portion 148, and a cup-shaped central portion 150 that extends between the hub portion and the flange portion. A passage 152 extends axially through the hub portion 146 of the actuator disk 144. The passage 152 is sized for receiving the shaft 126. The actuator disk 144 is preferably made from a low friction plastic material so that the hub portion 146 acts as a bearing for enabling relative rotation between the shaft 126 and the actuator disk 144.

The cup-shaped central portion 150 of the actuator disk 144 includes a radially extending portion 156 and an axially extending portion 158. The radially extending portion 156 extends from the hub portion 146 to the axially extending portion 158. As is shown in FIG. 5, an arcuate opening 160 extends through the radially extending portion 156 of the cup-shaped central portion 150 of the actuator disk 144. The axially extending portion 158 of the cup-shaped central portion 150 of the actuator disk 144 extends axially, relative to axis A, from the radially extending portion 156.

The hub portion 146 and the cup-shaped central portion 150 of the actuator disk 144 collectively form an annular chamber 164 (FIG. 4) in the actuator disk. The annular chamber 164 extends radially between the hub portion 146 and the axially extending portion 158 of the cup-shaped central portion 150 of the actuator disk 144. The arcuate opening 160 in the radially extending portion 156 of the cup-shaped central portion 150 leads to the annular chamber 164. As is shown in FIG. 4, the cylindrical post 118 that extends axially outwardly from the first webbing guide 110 of the spool 106 extends through the arcuate opening 160 and terminates in the annular chamber 164.

The flange portion 148 of the actuator disk 144 extends radially outwardly, relative to axis A, from the axially extending portion 158 of the cup-shaped central portion 150 of the actuator disk. The flange portion 148 is located radially adjacent an opening to the annular chamber 164 in the actuator disk 144. Ratchet teeth 166 are disposed in a circular array on an outer periphery of the flange portion 148.

A spiral spring 172 is located in the annular chamber 164 of the actuator disk 144. The spiral spring 172 includes inner and outer ends 174 and 176, respectively. The inner end 174 of the spiral spring 172 is affixed to the hub portion 146 of the actuator disk 144 and the outer end 176 of the spiral spring is affixed to the cylindrical post 118 that extends into the annular chamber 164 from the first webbing guide 110 of the spool 106. The spiral spring 172 biases the actuator disk 144 for rotation with the spool 106. When relative rotation occurs between the actuator disk 144 and the spool 106, the spiral spring 172 is tensioned.

A locking pawl 180 (FIG. 4) is located within the opening 66 in the first side wall 60 of the frame 56. The locking pawl 180 includes an axially extending shaft 182 that is pivotally supported in the first webbing guide 110 of the spool 106. A protrusion 184 extends axially from the actuator disk 144 and into a slot (not shown) that is formed in the locking pawl 180.

The locking pawl 180 is shown in FIG. 4 in an unactuated condition in which the locking pawl is spaced away from the ratchet teeth 68 on the first side wall 60 of the frame 56. The locking pawl 180 moves from the unactuated condition to an actuated condition in response to relative rotation between the spool 106 and the actuator disk 144. When in the actuated condition, the locking pawl 180 is pivoted relative to the first webbing guide 110 and into engagement with a ratchet tooth 68 on the first side wall 60 of the frame 56. When the locking pawl 180 engages a ratchet tooth 68 on the first side wall 60 of the frame 56, the spool 106 is prevented from rotating relative to the frame 56 in a belt withdrawal direction.

The retractor 40 also includes a vehicle sensitive sensor 190 for sensing vehicle conditions that may be indicative of a vehicle crash event, such as vehicle deceleration and vehicle tilt. As shown in FIGS. 5 and 6, the vehicle sensitive sensor 190 includes an inertial mass 192. Preferably, the inertial mass 192 is a ball formed from a corrosion resistant metal or other high density material. A support portion 194 of the vehicle sensitive sensor 190 supports the inertial mass 192. The support portion 194 is fixed to the cover 78 and is also fixed relative to the frame 56 of the retractor 40.

The vehicle sensitive sensor 190 also includes a sensor lever 196. The sensor lever 196 is pivotally mounted on the support portion 194. The sensor lever 196 includes a cap portion 198 that rests upon the inertial mass 192 and a locking arm 200 that extends generally upwardly and rightward from the cap portion, as viewed in FIGS. 5 and 6. The locking arm 200 is disposed in the same plane as the ratchet teeth 166 on the actuator disk 144, as is shown in FIG. 4.

When the retractor 40 is connected with the seat 10, as shown in FIGS. 1 and 2, the vehicle sensitive sensor 190 is responsive to sensed vehicle conditions when the backrest portion 16 of the seat 10 is fixed relative to the cushion portion 14 of the seat, i.e., when the seat back latch mechanism 26 is in the latched condition. The vehicle sensitive sensor 190 may also be responsive to a condition of the backrest portion 16 of the seat 10, such as tilting due to folding or reclining.

The inertial mass 192 of the vehicle sensitive sensor 190 moves relative to the support portion 194 in response to the sensed condition. For example, when the seat back latch mechanism 26 is in the latched condition and the vehicle experiences a sudden deceleration, the frame 56 of the retractor 40, which due to the latched condition of the seat back latch mechanism 26 is fixed relative to the vehicle 12, also experiences the deceleration. Since the support portion 194 of the vehicle sensitive sensor 190 is fixed relative to the frame 56 of the retractor 40, the support portion 194 also experiences the deceleration. The inertial mass 192, however, is not fixed relative to the vehicle 12 and continues in motion as the deceleration occurs. As a result, the inertial mass 192 moves relative to the support portion 194. Movement of the inertial mass 192 relative to the support portion 194 of the vehicle sensitive sensor 190 results in pivotal movement of the sensor lever 196 relative to the support portion.

Under normal vehicle conditions, the inertial mass 192 rests on the support portion 194 and gravity acts on the sensor lever 196 to position the cap portion 198 of the sensor lever upon the inertial mass, as shown in FIGS. 5 and 6. When the cap portion 198 is positioned upon the inertial mass 192, the locking arm 200 is spaced away from the ratchet teeth 166 on the actuator disk 144, as is shown in FIG. 5. When the inertial mass 192 moves relative to the support portion 194 by at least a predetermined amount, as, for example, when the vehicle 12 experiences a sudden deceleration, the locking arm 200 moves into engagement with a ratchet tooth 166 of the actuator disk 144. The engagement between the locking arm 200 and the ratchet tooth 166 prevents rotation of the actuator disk 144 in the belt withdrawal direction.

When the actuator disk 144 is prevented from rotating in the belt withdrawal direction, the spiral spring 172 resists rotation of the spool 106 in the belt withdrawal direction. When tension on the seat belt webbing 42 overcomes the bias of the spiral spring 172, as when vehicle deceleration causes a vehicle occupant to apply a load on the seat belt webbing, the spool 106 rotates in the belt withdrawal direction. Since the actuator disk 144 is prevented from rotating in the belt withdrawal direction, the spool 106 rotates relative to the actuator disk 144 and the spiral spring 172 is tensioned. As set forth above, the relative rotation between the actuator disk 144 and the spool 106 pivots the locking pawl 180 into the actuated condition in which the locking pawl engages a ratchet tooth 68 on the first side wall 60 of the frame 56. When the locking pawl 180 engages a ratchet tooth 68 on the first side wall 60 of the frame 56, the spool 106 is prevented from rotating in the belt withdrawal direction.

When tension is released from the seat belt webbing 42, as when a deceleration of the vehicle 12 ends, while the locking arm 200 of the sensor lever 196 remains in engagement with a ratchet tooth 166 of the actuator disk 144, the rewind spring 134 acts to rotate the spool 106 in the belt retraction direction. This rotation of the spool 106 removes from the spiral spring 172 the tension that resulted from the rotation of the spool 106 relative to the actuator disk 144. This rotation of the spool 106 in the belt retraction direction also returns the locking pawl 180 to the unactuated condition. When the tension is removed from the spiral spring 172, further rotation of the spool 106 in the belt retraction direction, under the influence of the rewind spring 134, causes the actuator disk 144 to rotate in the belt retraction direction. When the actuator disk 144 rotates in the belt retraction direction, the ratchet tooth 166 moves out of engagement with the locking arm 200 of the sensor lever 196 and the sensor lever is free to return to its original position upon the inertial mass 192.

The retractor 40 also includes a mechanism 206 for controlling the vehicle sensitive sensor 190. The mechanism 206 includes a gear train 208 (FIGS. 4 and 6). The gear train 208 includes a pinion gear 210, first and second intermediate gears 212 and 214, respectively, and a ring gear 216. The pinion gear 210 is formed on the shaft 126 and is fixed for rotation with the spool 106. The pinion gear 210 is in meshing engagement with the first intermediate gear 212. A projection 220 (FIG. 4) extends into the chamber 84 from the cover 78 to support the first intermediate gear 212 for rotation about the projection. The first intermediate gear 212 is formed as one piece with the second intermediate gear 214 and is fixed for rotation with the second intermediate gear. The second intermediate gear 214 has a smaller diameter than the first intermediate gear 212. In the embodiment illustrated in FIG. 4, the diameter of the second intermediate gear 214 is approximately one-third the diameter of the first intermediate gear 212.

As best shown in FIG. 6, the ring gear 216 includes a hub portion 224, an intermediate portion 226, and a peripheral portion 228. The hub portion 224 includes a central opening 230 (FIG. 4). As shown in FIG. 4, the protrusion 128 that rotatably supports the shaft 126 extends through the central opening 230 of the hub portion 224 and rotatably supports the ring gear 216 for rotation relative to the cover 78. As a result, the ring gear 216 is coaxial with the pinion gear 210 and is rotatable about axis A.

The peripheral portion 228 of the ring gear 216 is annular and extends completely around the hub portion 224. The intermediate portion 226 of the ring gear 216 connects the hub portion 224 to a segment of the peripheral portion 228. An arcuate opening 232 (FIG. 6) is formed in the ring gear 216 between an interior surface 234 of the peripheral portion 228 and an exterior surface 236 of the hub portion 224 and adjacent to the intermediate portion 226.

Gear teeth 238 are formed on the interior surface 234 of the peripheral portion 228 of the ring gear 216. The gear teeth 238 of the interior surface 234 meshingly engage with the second intermediate gear 214. The peripheral portion 228 of the ring gear 216 also includes an external surface 240 (FIG. 6) having a cam profile. More specifically, with reference to FIG. 6, the external surface 240 of the peripheral portion 228 includes first and second segments 246 and 248, respectively. The first segment 246 has a first radius and the second segment 248 has a second, larger radius. The first and second radii are measured relative to axis A. In FIG. 6, the first segment 246 (i.e., the smaller radius segment) extends over approximately forty-five degrees of the circumference of the peripheral portion 228 and the second segment 248 (i.e., the larger diameter segment) extends over the remaining approximately 315 degrees of the circumference of the peripheral portion.

The gear train 208 is designed so that the ring gear 216 rotates through an angle that is less than the angular extent of the arcuate opening 232 during withdrawal of the seat belt webbing 42 from a fully retracted condition, shown in FIG. 6, to a fully withdrawn condition. Preferably, the ring gear 216 rotates approximately 200 degrees during withdrawal of the seat belt webbing 42 from the fully retracted condition to the fully withdrawn condition.

Figure 11:
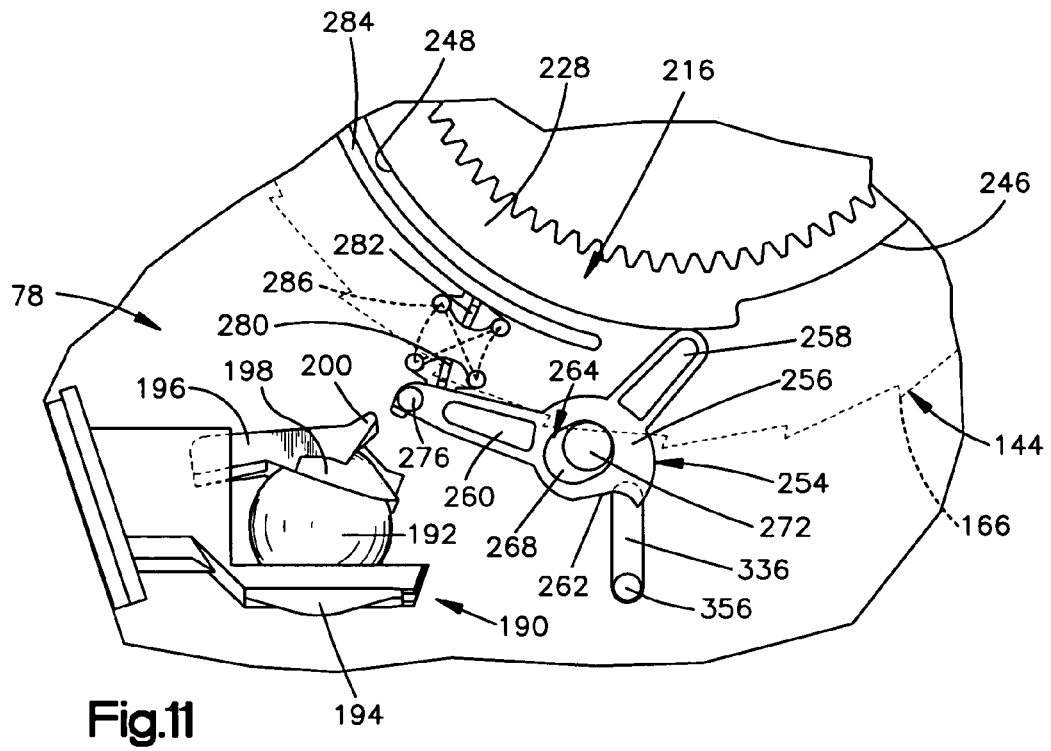
FIG. 11 is an enlarged view illustrating a control lever of the retractor of FIG. 1 in a first position.
Figure 12:
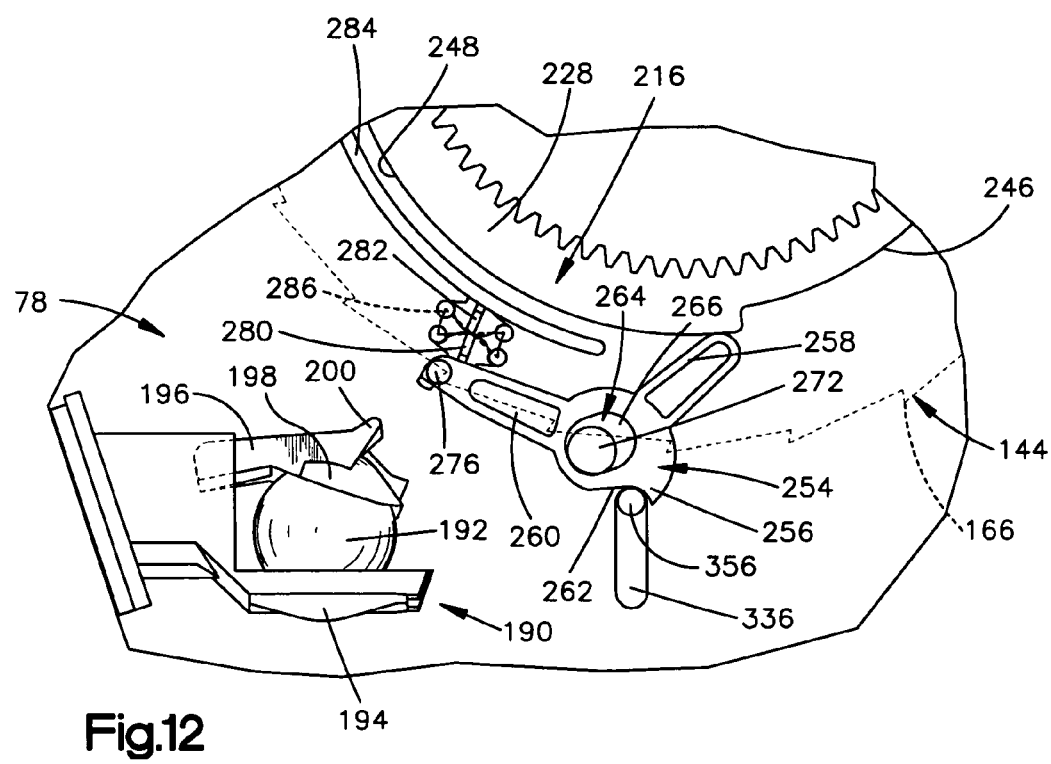
FIG. 12 is an enlarged view illustrating the control lever of the retractor of FIG. 1 in a second position.

In addition to the gear train 208, the mechanism 206 for controlling the vehicle sensitive sensor 190 also includes a control lever 254. As best shown in FIGS. 11 and 12, the control lever 254 includes a central hub 256 and first and second outwardly extending legs 258 and 260, respectively. The hub 256 has a curved lower surface 262 and an elongated central opening 264. The central opening 264 has a first end portion 266 (FIG. 12) located nearest the first leg 258 of the control lever 254 and a second end portion 268 (FIG. 11) nearest the second leg 260. A projection 272 (FIG. 4) extends into the chamber 84 from the cover 78. The projection 272 extends through the central opening 264 of the hub 256. The control lever 254 is pivotable on the projection 272.

The first leg 258 of the control lever 254 extends upwardly and rightward, as viewed in FIG. 6, from the hub 256. The first leg 258 engages the external surface 240 of the peripheral portion 228 of the ring gear 216. FIG. 6 illustrates the first leg 258 contacting the first segment 246 of the external surface 240. The second leg 260 extends leftward, as viewed in FIG. 6, from the hub 256. The first and second legs 258 and 260 are spaced from one another by an angle of approximately 110 degrees.

A blocking arm 276 extends axially from an end of the second leg 260 opposite the hub 256 to a position in the same plane as the sensor lever 196 of the vehicle sensitive sensor 190. FIG. 6 illustrates the blocking arm 276 engaging the cap portion 198 of the sensor lever 196.

As shown in FIGS. 11 and 12, a first spring seat 280 is located on an upper surface of the second leg 260 of the control lever 254. A second spring seat 282 is located on a protrusion 284 that extends into the chamber 84 from the end wall 80 of the cover 78. The second spring seat 282 is located above and slightly to the right, as viewed in FIG. 11, of the first spring seat 280.

A compression spring 286 includes opposite ends that are affixed to the first and second spring seats 282 and 284, respectively. The spring 286 biases the second leg 260 in a generally downward and slightly leftward direction, as viewed in FIG. 6. As a result of the bias of the spring 286, the projection 272 tends to be located in the first end portion 266 of the central opening 264. Also, as a result of the bias of the spring 286, the control lever 254 tends to pivot about the projection 272 in a counterclockwise direction, as viewed in FIG. 6, so that the first leg 258 of the control lever 254 engages the cam profile of the external surface 240 of the peripheral portion 228 of the ring gear 216.

When the control lever 254 is in the position shown in FIG. 6, the blocking arm 276 of the second leg 260 of the control lever 254 prevents pivotal movement of the sensor lever 196 of the vehicle sensitive sensor 190. Thus, when in the position shown in FIG. 6, the control lever 254 disables the vehicle sensitive sensor 190. The vehicle sensitive sensor 190 is disabled when the first leg 258 of the control lever 254 is located adjacent the first segment 246 of the external surface 240 of the peripheral portion 228 of the ring gear 216. The first leg 258 of the control lever 254 is adjacent the first segment 246 of the external surface 240 of the peripheral portion 228 of the ring gear 216 when the seat belt webbing 42 is in or near a fully retracted condition on the spool 106 of the retractor 40.

As the seat belt webbing 42 is withdrawn from the retractor 40 and the spool 106 is rotated in the belt withdrawal direction, the ring gear 216 is rotated in a counter-clockwise direction, as viewed in FIG. 6. During rotation of the ring gear 216, the first leg 258 of the control lever 254 moves along the external surface 240 of the peripheral portion 228 of the ring gear 216. When a predetermined amount of seat belt webbing 42 has been withdrawn from the retractor 40, the first leg 258 of the control lever 254 engages the second segment 248 of the external surface 240 of the peripheral portion 228 of the ring gear 216, as is shown in FIG. 11. The predetermined amount of seat belt webbing 42 at which the first leg 258 of the control lever 254 transitions from the first segment 246 to the second segment 248 preferably is an amount of seat belt webbing needed to enabling latching of the tongue assembly 46 in the buckle assembly 34 when the seat 10 is empty.

When the first leg 258 of the control lever 254 transitions from the first segment 246 to the second segment 248, the control lever 254 pivots clockwise from the position shown in FIG. 6 to the position shown in FIG. 11. During this pivotal movement of the control lever 254, the projection 272 about which the control lever 254 pivots remains in the first end portion 266 of the central opening 264.

When the first leg 258 of the control lever 254 engages the second segment 248 of the external surface 240 of the ring gear 216, the blocking arm 276 of the second leg 260 of the control lever 254 is spaced away from the cap portion 198 of the sensor lever 196 of the vehicle sensitive sensor 190, as shown in FIG. 11. The blocking arm 276 is also spaced away from the actuator disk 144. For clarity, the actuator disk 144 is shown by dashed lines in FIG. 11. When the blocking arm 276 is spaced away from the vehicle sensitive sensor 190, operation of the vehicle sensitive sensor 190 of the retractor 40 is enabled. Thus, the mechanism 206 for controlling the vehicle sensitive sensor 190 is responsive to the withdrawn length of the seat belt webbing 42 for enabling and disabling the vehicle sensitive sensor of the retractor 40.

By disabling the vehicle sensitive sensor 190, the mechanism 206 enables the backrest portion 16 of the seat 10 to be folded forward without the concern that the tilting of the retractor 40 will prevent the subsequent withdrawal of the seat belt webbing 42 and result in the backrest portion becoming locked in the folded condition. The mechanism 206 enables the vehicle sensitive sensor 190 when the seat belt system 30 extends about an occupant of the seat 10, i.e., the predetermined amount of the seat belt webbing 42 has been withdrawn from the retractor 40.

The retractor 40 also includes a mechanism 294 (FIG. 3) for preventing rotation of the spool 106 in the belt withdrawal direction when the seat back latch mechanism 26 is in the unlatched condition. The mechanism 294 includes a control cable 296, shown schematically in FIG. 2 that extends between the handle 28 of the seat back latch mechanism 26 and the retractor 40. A portion of the control cable 296 is shown in FIG. 4. The control cable 296 illustrated in FIG. 4 is a Bowden cable having an outer sleeve 298 that is fixed relative to both the seat back latch mechanism 26 and the retractor 40 and an inner cable 300 that is movable relative to the outer sleeve 298 in response to movement of the handle 28 of the seat back latch mechanism 26. The control cable 296 may include one or more springs (not shown) to bias the inner cable 300 in a desired direction. For example, the seat back latch mechanism 26 may apply a force to the inner cable 300 which pulls the inner cable 300 away from the retractor 40. In such case, a coil spring associated with the control cable 296 could be provided to oppose the force of the seat back latch mechanism 26 and bias the inner cable 300 back toward the retractor.

In a preferred embodiment, a short length of the inner cable 300 extends between the outer sleeve 298 and an actuator 306 (FIG. 7) of the mechanism 294 of the retractor 40 when the seat back latch mechanism 26 is in the latched condition. A long length of the inner cable 300 extends between the outer sleeve 298 and the actuator 306 of the mechanism 294 of the retractor 40 when the seat back latch mechanism 26 is in the unlatched condition.

As shown in FIG. 7, the actuator 306 is fixed to an end of the inner cable 300 of the control cable 296 nearest the retractor 40. The actuator 306 has a block-shaped main body portion 308. First and second actuator pins 310 and 312, respectively, extend outward from opposite sides of the main body portion 308.

The mechanism 294 also includes a slider assembly 318 (FIG. 3). The slider assembly 318 includes a housing portion 320 and a slider portion 322. The housing portion 320 of the slider assembly 318 is fixed to the cover 78 outside of chamber 84. The housing portion 320 defines an L-shaped chamber 326 having a vertical portion 328 and the horizontal portion 330, as viewed in FIGS. 3, 4, 9, and 10. The vertical portion 328 of the chamber 326 is defined between the end wall 80 of the cover 78 and a vertical wall 332 of the housing portion 320. An elongated slot 336 extends through the cover 78 to connect the vertical portion 328 of the chamber 326 with chamber 84. As FIG. 11 illustrates, the slot 336 is located below and slightly to the right of the protrusion 272 that supports the control lever 254. The horizontal portion 330 of the chamber 326 is defined between the outer wall 82 of the cover 78 and a horizontal wall 338 of the housing portion 320.

The slider portion 322 is generally L-shaped and includes a main body portion 344 and two leg portions 346 and 348 (FIG. 7). As shown in FIGS. 9 and 10, the main body portion 344 extends generally vertically and the two leg portions, only leg portion 346 is shown, extend generally horizontally. As shown in FIG. 7, the main body portion 344 of the slider portion 322 is generally rectangular with a rounded protrusion 350 that extends to the right, as viewed in FIG. 7. As best shown in FIG. 8, the main body portion 344 includes opposite inner and outer surfaces 352 and 354, respectively. A pin 356 extends outwardly of the inner surface 352 of the protrusion 350 of the main body portion 344. The pin 356 extends in a direction parallel to the two leg portions 346 and 348.

As shown in FIGS. 7 and 8, the two leg portions 346 and 348 are spaced from one another by a distance sufficient to receive the main body portion 308 of the actuator 306. A slot extends through each of the leg portions 346 and 348. FIGS. 3, 4, 9, and 10 illustrate the slot 358 in leg portion 346. The slot 358 extends downwardly as the slot extends toward the main body portion 344. The slot (not shown) in leg portion 348 is identical to the slot 358 in leg portion 346.

When the slider assembly 318 is assembled, the pin 356 that extends from the main body portion 344 of the slider portion 322 is inserted into the slot 336 in the cover 78. The actuator 306 is located between the leg portions 346 and 348 of the slider portion 322 so that one of the actuator pins 310 and 312 of the actuator is located in each slot 358 the leg portions 346 and 348. The end of the inner cable 300 of the control cable 296 is then fixed to the actuator 306 in a known manner. The housing portion 320 of the slider assembly 318 is then placed over the slider portion 322 and is fixed to the cover 78. When the slider portion 322 of the slider assembly 318 is located in the chamber 326 of the housing portion 320, the main body portion 344 of the slider portion 322 is interposed between the cover 78 and the housing portion 320. As a result, the slider portion 322 is generally prevented from moving horizontally, as viewed in FIGS. 3, 4, 9, and 10.

An end of the inner cable 300 opposite the actuator 306 is then fixed to the handle 28 of the seat back latch mechanism 26 in a known manner. As is shown in FIG. 9, the end of the inner cable 300 is fixed to the handle 28 of the seat back latch mechanism 26 so that, when the seat back latch mechanism is in the latched condition, a longer portion of the inner cable 300 is located between the outer sleeve 298 and the handle 28. When a longer portion of the inner cable 300 is located between the outer sleeve 298 and the handle 28, a shorter portion of the inner cable 300 is located between the outer sleeve 298 and the actuator 306. As a result, the actuator pins 310 and 312 are located in the portion of the slots 358 of the leg portions 346 and 348 of the slider portion 322 farthest from the main body portion 344, as shown in FIG. 9. When the actuator pins 310 and 312 are located in the portion of the slots 358 of the leg portions 346 and 348 of the slider portion 322 farthest from the main body portion 344, the slider portion 322 of the slider assembly 318 is in a first position relative to the housing portion 320. In the first position, as illustrated in FIG. 9, the slider assembly 318 is located adjacent the horizontal wall 338 of the housing portion 320. When the slider portion 322 is in the first position, the pin 356 is located at the lowermost end of the slot 336, as shown in FIGS. 5, 6, and 11.

FIG. 10 illustrates the handle 28 of the seat back latch mechanism 26 when the seat back latch mechanism is in an unlatched condition. The handle 28 is rotated clockwise, as viewed in FIGS. 9 and 10, about a pivot pin 378 when moved from the latched condition to the unlatched condition. When the handle 28 of the seat back latch mechanism 26 is moved to the unlatched condition, the inner cable 300 is pushed through the outer sleeve 298 in a known manner toward the retractor 40. As a result, when the seat back latch mechanism 26 is in the unlatched condition, a shorter portion of the inner cable 300 is located between the outer sleeve 298 and the handle 28 and a longer portion of the inner cable 300 is located between the outer sleeve 298 and the actuator 306.

When the length of the inner cable 300 located between the outer sleeve 298 and the actuator 306 lengthens, the actuator 306 is moved leftward, as viewed in FIGS. 9 and 10. When the actuator 306 is moved leftward, the actuator pins 310 and 312 move along the slots 358 of the leg portions 346 and 348 from the position shown in FIG. 9 to the position shown in FIG. 10. In FIG. 10, the actuator pins 310 and 312 are located in a portion of the slot 358 nearest the main body portion 344 of the slider portion 322.

The movement of the actuator pins 310 and 312 through the slots 358 of the leg portions 346 and 348 of the slider portion 322 creates a force acting on the slider portion that tends to move the slider portion in a direction normal to the extent of the slot 358, i.e., up and to the left as viewed in FIG. 9. In response to the force, the outer surface 354 of the slider portion 322 engages the vertical wall 332 of the housing portion 320 and slides upwardly, as viewed in FIG. 9, relative to the housing portion and into a second position. In the second position, illustrated in FIG. 10, the slider portion 322 is located adjacent the outer wall 82 of the cover 78 and is spaced away from the horizontal wall 338 of the housing portion 320. When the slider portion 322 is in the second position, the pin 356 is located at the uppermost end of the slot 336, as shown in FIGS. 10 and 12.

When the seat belt webbing 42 is in or near a fully retracted condition on the spool 106, the first leg 258 of the control lever 254 is located adjacent the first segment 246 of the external surface 240 of the peripheral portion 228 of the ring gear 216 and the spring 286 biases the control lever into the position shown in FIG. 6, regardless of the location of the cylindrical pin 256 in the slot 336. When the seat back latch mechanism 26 is moved to the unlatched condition while the control lever 254 is in the position shown in FIG. 6, the pin 356 moves to the uppermost end of the slot 336 and adjacent the curved lower surface 262 of the control lever 254 as shown in FIG. 12.

As the seat belt webbing 42 is subsequently withdrawn from the retractor 40 and the spool 106 is rotated in the belt withdrawal direction, the ring gear 216 is rotated in a counter-clockwise direction, as viewed in FIG. 6. During rotation of the ring gear 216, the first leg 258 of the control lever 254 moves along the external surface 240 of the peripheral portion 228 of the ring gear 216. When a predetermined amount of seat belt webbing 42 has been withdrawn from the retractor 40, the first leg 258 of the control lever 254 engages the second segment 248 of the external surface 240 of the peripheral portion 228 of the ring gear 216, as previously described. When the first leg 258 of the control lever 254 transitions from the first segment 246 to the second segment 248, the control lever 254 pivots clockwise from the position shown in FIG. 6 to the position shown in FIG. 12. During this pivotal movement of the control lever 254, the curved lower surface 262 of the hub 256 engages the pin 356 of the slider portion 322 of the slider assembly 318. As a result, during the pivotal movement of the control lever 254, the control lever 254 moves on the projection 272 so that the projection moves from the first end portion 266 of the central opening 264 to the second end portion 268 of the central opening. As a result, the second leg 260 of the control lever 254 moves farther upward than when the projection 272 remains in the first end portion 266 of the central opening 264 (shown in FIG. 11).

When the first leg 258 of the control lever 254 engages the second segment 248 of the external surface 240 of the ring gear 216, the blocking arm 276 of the second leg 260 of the control lever 254 engages a ratchet tooth 166 on the actuator disk 144. For clarity, the actuator disk 144 is shown by dashed lines in FIG. 12. The engagement between the blocking arm 276 of the control lever 254 and the ratchet tooth 166 of the actuator disk 144 prevents rotation of the actuator disk in the belt withdrawal direction.

When the actuator disk 144 is prevented from rotating in the belt withdrawal direction, the spiral spring 172 resists rotation of the spool 106 in the belt withdrawal direction. When tension on the seat belt webbing 42 overcomes the bias of the spiral spring 172, such as when an occupant attempts to withdraw the seat belt webbing 42 further, the spool 106 rotates in the belt withdrawal direction. Since the actuator disk 144 is prevented from rotating in the belt withdrawal direction by the blocking arm 276 of the control lever 254, the spool 106 rotates relative to the actuator disk 144 and the spiral spring 172 is tensioned. The relative rotation between the actuator disk 144 and the spool 106 pivots the locking pawl 180 into the actuated condition in which the locking pawl engages a ratchet tooth 68 on the first side wall 60 of the frame 56. When the locking pawl 180 engages a ratchet tooth 68 on the first side wall 60 of the frame 56, the spool 106 is prevented from rotating in the belt withdrawal direction.

When tension is released from the seat belt webbing 42, the rewind spring 134 rotates the spool 106 in the belt retractor direction. When the first leg 258 of the control lever 254 transitions back to the first segment 246 of the external surface 240 of the ring gear 216, the bias of the compression spring 286 causes the control lever 254 to move so the projection 272 returns to the first end portion 266 of the central opening 264 of the control lever. As a result, the control lever 254 returns to the position illustrated in FIG. 6.

By preventing rotation of the spool 106 in the belt withdrawal direction when the seat back latch mechanism 26 is in the unlatched condition, the mechanism 294 prevents an occupant of the seat 10 from putting on the seat belt while the seat back latch mechanism is in the unlatched condition. When the seat back latch mechanism 26 is in the latched condition and vehicle sensitive sensor 190 is not engaging the actuator disk 144, the seat belt webbing 42 may be withdrawn from the retractor 40.

Figure 13:
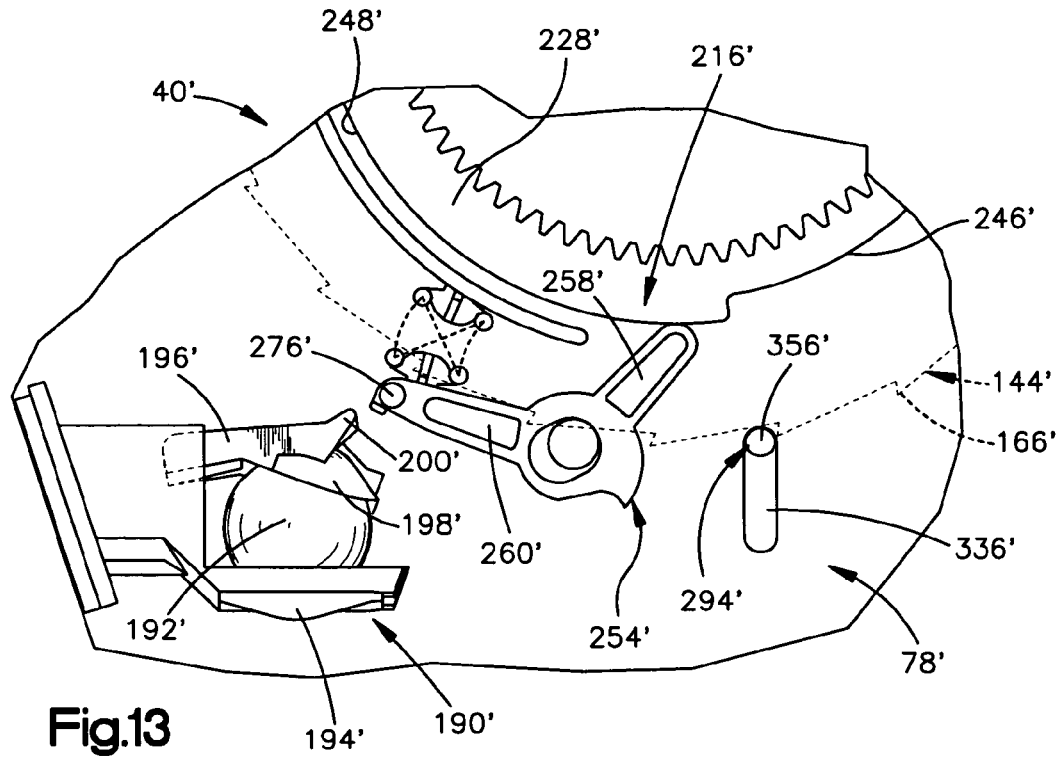
FIG. 13 illustrates a portion of a retractor constructed in accordance with a second embodiment of the present invention.

FIG. 13 illustrates a portion of a retractor 40' constructed in accordance with a second embodiment of the present invention. Features of FIG. 13 that are the same as or similar to those described with regard to FIGS. 3-12 are given the same reference numbers with the addition of a prime.

The retractor 40' is identical to the retractor 40 previously described with the exception that, in the embodiment of FIG. 13, the slot 336' in the cover 78' is located away from the control lever 254'. The uppermost end of the slot 336' terminates adjacent the actuator disk 144'. The slider assembly of the mechanism 294' for preventing rotation of the spool in the belt withdrawal direction when the seat back latch mechanism is in the unlatched condition is identical to the slider assembly 318 of the mechanism 294 described with reference to FIGS. 3-12. In the embodiment of FIG. 13, when the seat back latch mechanism is in the unlatched condition, the pin 356' is moved to the uppermost end of the slot 336' and to a position adjacent the actuator disk 144'. For clarity, the actuator disk 144' is shown by dashed lines in FIG. 13.

As the seat belt webbing is subsequently withdrawn from the retractor 40' and the spool is rotated in the belt withdrawal direction, a ratchet tooth 166' of the actuator disk 144' engages the pin 356'. Further rotation of the spool in the belt withdrawal direction causes a locking pawl of the retractor 40' to engage a ratchet tooth on a first side wall of a frame so as to prevent the spool from rotating in the belt withdrawal direction, in the manner previously described.

FIGS. 14-18 illustrate a portion of a retractor 40" constructed in accordance with a third embodiment of the present invention. Features of FIGS. 14-18 that are the same as or similar to those described with regard to FIGS. 3-12 are given the same reference numbers with the addition of a double prime.

The retractor 40" is similar to the retractor 40 previously described. However, in the embodiment of FIGS. 14-18, the slot 336" in the cover 78" is located away from the control lever and the mechanism 294" for preventing rotation of the spool in the belt withdrawal direction when the seat back latch mechanism is in the unlatched condition is of a different configuration than in the previous embodiments. As shown best in FIG. 14, the slot 336" is located adjacent the actuator disk 144".

Figure 14:
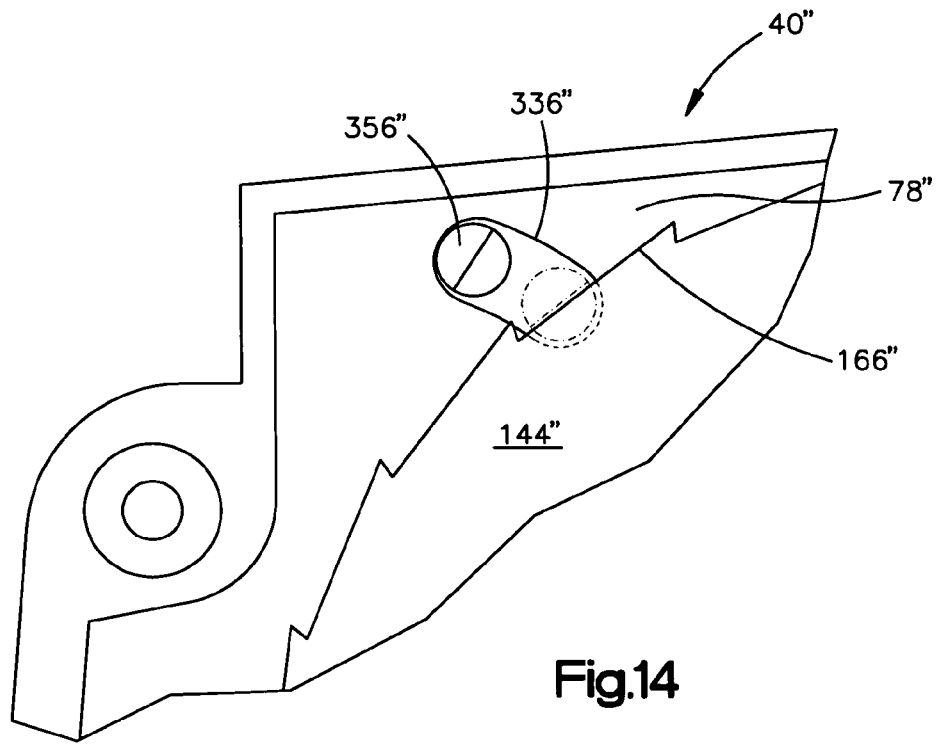
FIG. 14 illustrates a portion of a retractor constructed in accordance with a third embodiment of the present invention.

The slider assembly 318" of the mechanism 294" for preventing rotation of the spool in the belt withdrawal direction when the seat back latch mechanism is in the unlatched condition is depicted in detail in FIGS. 15-18. When the seat back latch mechanism is in the unlatched condition, the pin 356" is moved to the lowermost end of the slot 336" and to a position adjacent the actuator disk 144", as shown in FIG. 14 in phantom, and is positioned to engage at least one of the ratchet teeth 166". When the seat back latch mechanism of the embodiment of FIGS. 14-18 is in the latched condition, the pin 356" is moved to the uppermost end of the slot 336" and to a position spaced from the actuator disk 144", as shown in FIG. 14 in solid lines.

The motion of the pin 356" is produced by the slider assembly 318", which includes a slider block 370 in combination with a coupling 372 connecting the slider block 370 with a pin rocker 374. The coupling 372 may be a soft coupling 372, as shown in FIGS. 15-18, or may be any other type of coupling as desired for a particular application of the retractor 40". A soft coupling 372 includes one or more flexible elements (e.g., the springs shown in the coupling 372 of FIGS. 15-18) that allow some degree of relative movement between the parts connected by the soft coupling 372. A soft coupling 372 may be desirable to protect one portion of the slider assembly 318" from an abrupt force or sudden impulse applied to another portion of the slider assembly 318".

The slider assembly 318" is shown in detail in FIGS. 15-18. When the slider assembly 318" is assembled, the pin 356" that extends from the pin rocker 374 is inserted into the slot 336" in the cover 78". The pin rocker 374 operatively couples the pin 356" with the coupling 372. The pin rocker 374 is mounted to the cover 78" with a pivot pin 376 and selectively pivots about a central axis of the pivot pin 376.

The end of the inner cable 300" of the control cable 296" is fixed to the slider block 370 in a known manner. A housing portion 320" (FIGS. 17-18) of the slider assembly 318" is then placed over the slider block 370 and pin rocker 374 and is fixed to the cover 78". When the slider block 370 of the slider assembly 318" is located in the chamber 326" of the housing portion 320", the slider block 370 is generally constrained to vertical motion, as shown in FIGS. 17 and 18.

An end of the inner cable 300" opposite the slider block 370 is fixed to the handle 28" of the seat back latch mechanism 26" in a known manner. As shown in FIG. 17, the end of the inner cable 300" is fixed to the handle 28" of the seat back latch mechanism 26" so that, when the seat back latch mechanism is in the latched condition, a shorter portion of the inner cable 300" is located between the outer sleeve 298" and the handle 28". When a shorter portion of the inner cable 300" is located between the outer sleeve 298" and the handle 28", a longer portion of the inner cable 300" is located between the outer sleeve 298" and the slider block 370. As a result, the slider block 370 is urged upward into the first position, as shown in FIGS. 15 and 17.

Figure 15:
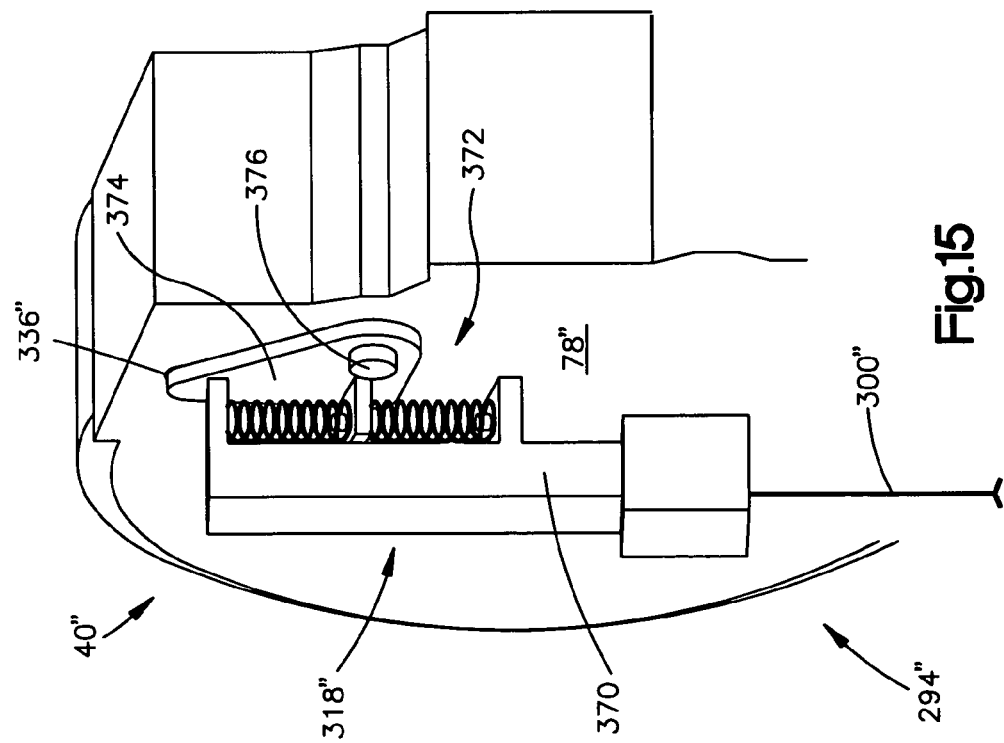
FIG. 15 is an enlarged view of a mechanism of the retractor of FIG. 14 in a first condition.

When the slider block 270 is pushed into the first position by extension of the inner cable 300" toward the retractor 40", the coupling 372 rotates the pin rocker 374 about the pivot pin 376 (forward out of the plane of the drawings, in the orientation of FIGS. 15 and 17). The pin 356" moved by the pin rocker 374 thus becomes located at the uppermost end of the slot 336", as shown in FIGS. 15 and 17 and in solid line in FIG. 14. As a result, the actuator disk 144" is allowed to rotate in the belt withdrawal direction and the retractor 40" may operate unrestrained by the mechanism 294" for preventing rotation of the spool in the belt withdrawal direction when the seat back latch mechanism 26" is latched.

FIG. 18 illustrates the handle 28" of the seat back latch mechanism 26" when the seat back latch mechanism is in an unlatched condition. The handle 28" is rotated counterclockwise, as shown in FIGS. 17 and 18, about a handle pivot pin 378 when moved from the latched condition of FIG. 17 to the unlatched condition of FIG. 18. When the handle 28" of the seat back latch mechanism 26" is moved to the unlatched condition, the inner cable 300" is pushed through the outer sleeve 298" in a known manner toward the retractor 40". As a result, when the seat back latch mechanism 26" is in the unlatched condition, a longer portion of the inner cable 300" is located between the outer sleeve 298" and the handle 28" and a shorter portion of the inner cable 300" is located between the outer sleeve 298" and the slider block 370.

Figure 16:
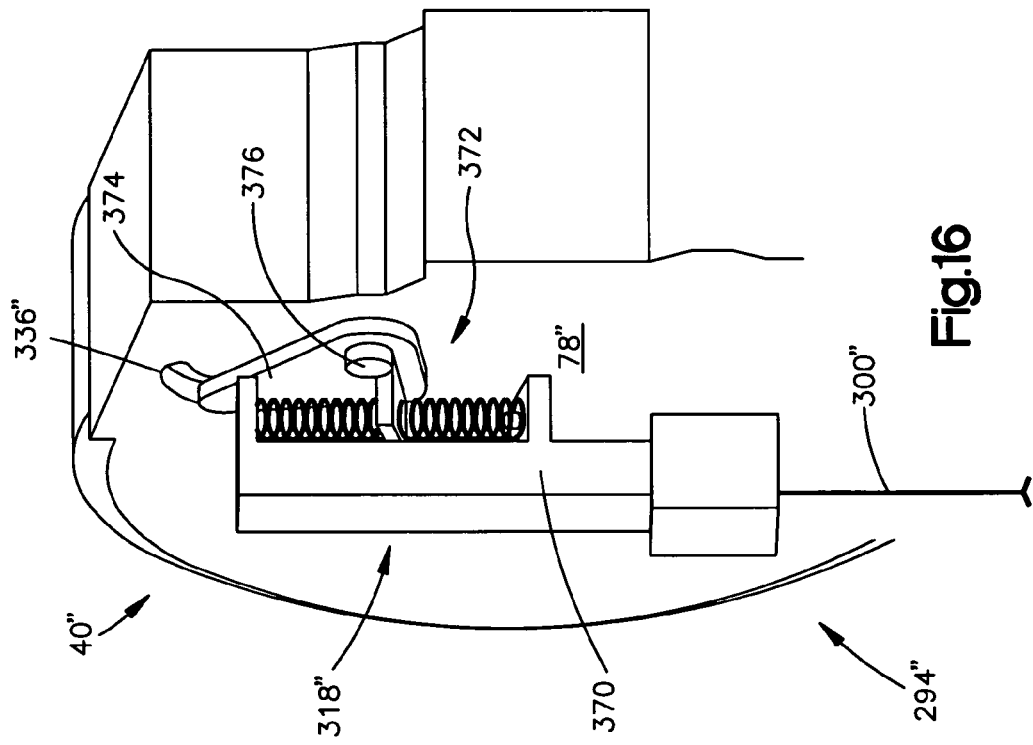
FIG. 16 is an enlarged view of the mechanism of FIG. 15 in a second condition.

As shown in FIGS. 16 and 18, then, when the slider block 270 is pulled into the second position by retraction of the inner cable 300" toward the handle 28", the coupling 372 rotates the pin rocker 374 about the pivot pin 376 (back into the plane of the drawings, in the orientation of FIGS. 16 and 18). The pin 356" moved by the pin rocker 374 thus moves to the lowermost end of the slot 336", as shown in FIGS. 16 and 18 and in phantom in FIG. 14. As the seat belt webbing is subsequently withdrawn from the retractor 40" and the spool is rotated in the belt withdrawal direction, a ratchet tooth 166" of the actuator disk 144" engages the pin 356". Further rotation of the spool in the belt withdrawal direction causes a locking pawl of the retractor 40" to engage a ratchet tooth on a first side wall of a frame so as to prevent the spool from rotating in the belt withdrawal direction, in the manner previously described. The retractor 40" thus locks up and does not allow seat belt webbing to be withdrawn when the seat back latch mechanism 26" is unlatched. Therefore, an occupant is forced to place the seat back latch mechanism 26" into the latched condition prior to withdrawing and buckling the seat belt webbing.

In some applications of the claimed retractor 40", it is desirable that the mechanism 294" have a default condition of preventing rotation of the spool in the belt withdrawal direction if the latched or unlatched condition of the seat back latch mechanism cannot be determined. For example, a manufacturer may wish to prevent withdrawal of the seat belt webbing if the inner cable 300" or seat belt latch mechanism 26" is broken or defective, so that the occupant cannot withdraw and buckle the seat belt webbing until the inner cable 300" or seat belt latch mechanism 26" is repaired. In such applications, and as shown in FIGS. 17 and 18, a biasing spring 380 may be provided to urge the slider block 370 downward into the second position—bringing the pin 356" into engagement with the actuator teeth 166"—unless the inner cable 300"

pushes the slider block 370 upward with sufficient force to overcome the biasing spring 380. When the biasing spring 380 is present, the actuating force for the biasing spring 380 should be chosen with respect to the actuating force for the coupling 372 to ensure desired operation of the interface between the slider block 370 and the pin rocker 374.

FIGS. 19-23 illustrate a portion of a retractor 40''' constructed in accordance with a fourth embodiment of the present invention. Structural features of FIGS. 19-23 that are the same as or similar to features described with regard to FIGS. 3-12 and 14-18 are given the same reference numbers with the addition of a triple prime.

The retractor 40''' is similar to the retractor 40'' previously described with reference to FIGS. 14-18. In the embodiment of FIGS. 19-23, however, a third mechanism 400 is provided in addition to the first and second mechanisms 190''' and 294''', which are, as shown in FIGS. 19-23, the vehicle sensitive sensor 190''' (shown only in part in these Figs. for greater clarity) and the mechanism 294''' for preventing rotation of the spool in the belt withdrawal direction when the seat back latch mechanism is in the unlatched condition. The third mechanism 400 acts cooperatively with the second mechanism 294''' to allow the spool to rotate in the belt withdrawal direction even if the seat belt latch mechanism is in an unlatched condition. An appropriate situation for operation of the third mechanism 400, for example, may occur when the backrest cushion 16''' has been folded forward and the first mechanism 190''' has been disabled but the second mechanism 294'' is preventing the spool from rotating in the belt withdrawal direction because the seat belt latch mechanism is in an unlatched condition. In this situation, the pin 356''' would normally prevent the actuator disk 144''' from turning and the seat belt webbing might then prevent the seatback from being returned to an upright position. However, the third mechanism 400 acts in cooperation with the coupling 372''' to allow the actuator disk 144''' to turn despite the unlatched status of the seat belt latch mechanism in this fourth embodiment of the present invention.

Figure 19:
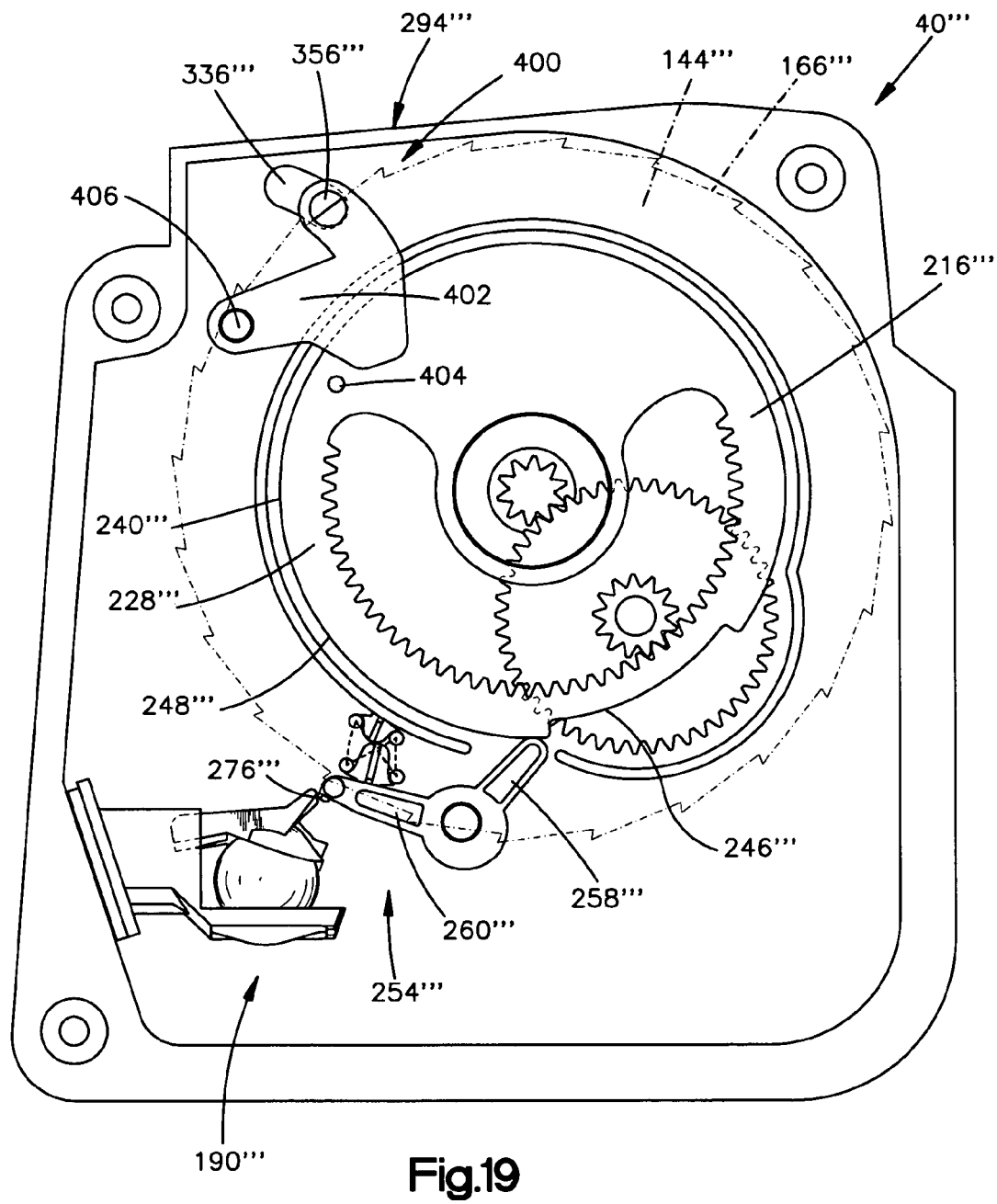
FIG. 19 is a schematic side view illustrating a retractor constructed in accordance with a fourth embodiment of the present invention.
Figure 20:
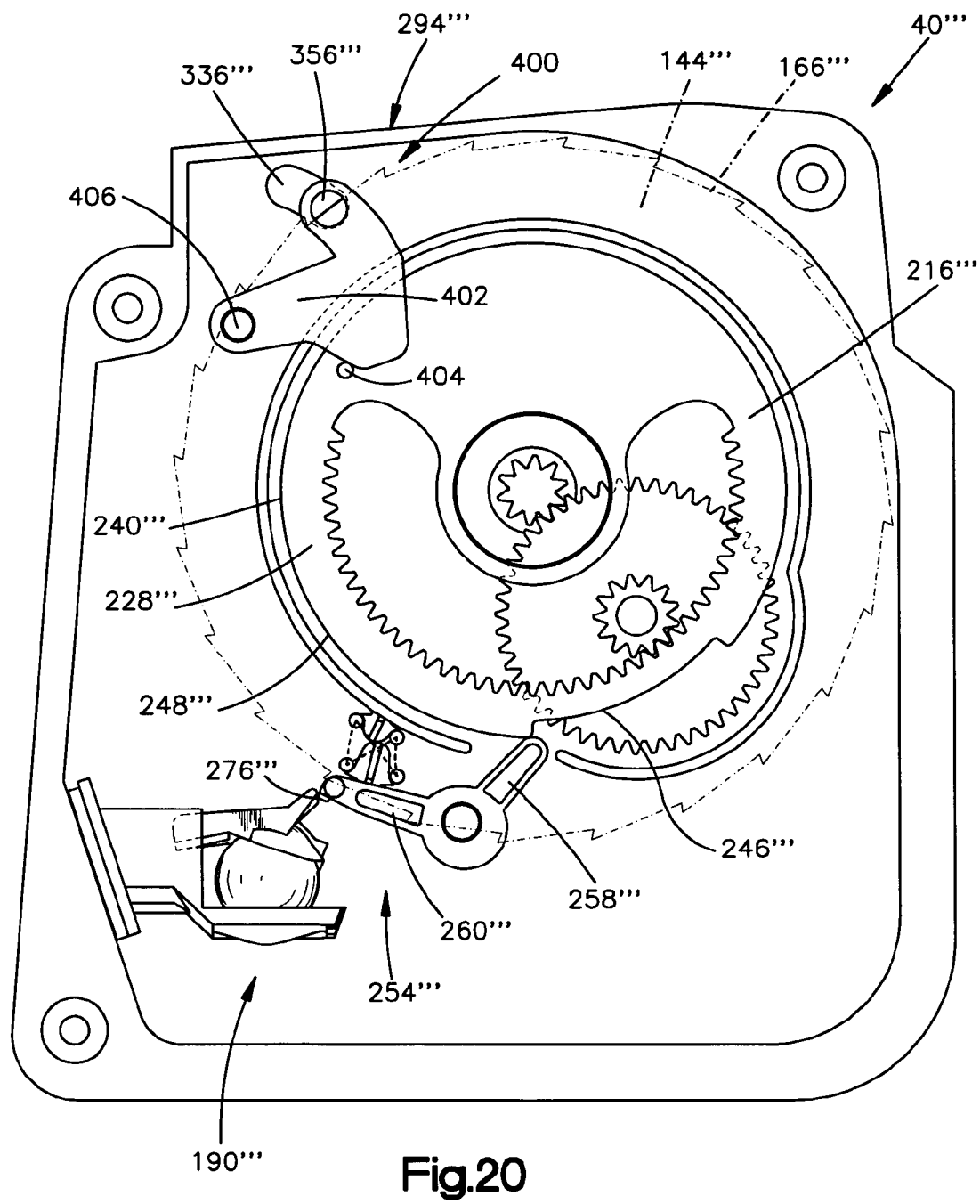
FIG. 20 is a schematic side view illustrating the retractor of FIG. 19.

As shown in FIGS. 19-23, the slot 336''' is located adjacent the actuator disk 144'''. The slider assembly 318''' of the mechanism 294''' for preventing rotation of the spool in the belt withdrawal direction when the seat back latch mechanism is in the unlatched condition is depicted in detail in FIG. 23. In the embodiment of FIGS. 19-23, when the seat back latch mechanism is in the unlatched condition, the pin 356''' is normally moved to the lowermost end of the slot 336''' and to a position adjacent the actuator disk 144''', as shown in FIG. 19, and is positioned to engage at least one of the ratchet teeth 166'''. Nonetheless, the third mechanism 400 can cause the pin 356''' to move to the uppermost end of the slot 336''' and to a position spaced from the actuator disk 144''' even though the seat back latch mechanism is still in the unlatched condition, as shown in the sequence depicted in FIGS. 19-22.

The slider assembly 318''' of the fourth embodiment operates substantially similarly to the slider assembly 318'' of the third embodiment and the above description of operation of the slider assembly 318'' will not be repeated here. The following description simply presumes that the seat back latch mechanism remains in the unlatched position throughout and that the slider block 370 has positioned the pin 356''' into engagement with the actuator teeth 166''', as shown in FIG. 19.

The motion of the pin 356'' imposed by the third mechanism 400 is achieved by using an override actuator 402, which engages an override pin 404 connected with the ring gear 216''', as shown in FIGS. 19-22. FIGS. 19-22 illustrate a sequence of movements of the retractor 40''' that bring the override pin 404 into engagement with the override actuator 402 and thereby pivot the override actuator 402 to disengage the pin 356''' from the actuator teeth 166'''. In the sequence depicted in FIGS. 19-22, the actuator disk 144''' is rotating in a direction opposite the belt withdrawal direction (counterclockwise, as shown in FIGS. 19-22) and the ring gear 216''' is rotating in the belt withdrawal direction (clockwise, as shown), in a similar operation as that discussed above with reference to the embodiment shown in FIGS. 5 and 6.

Figure 21:
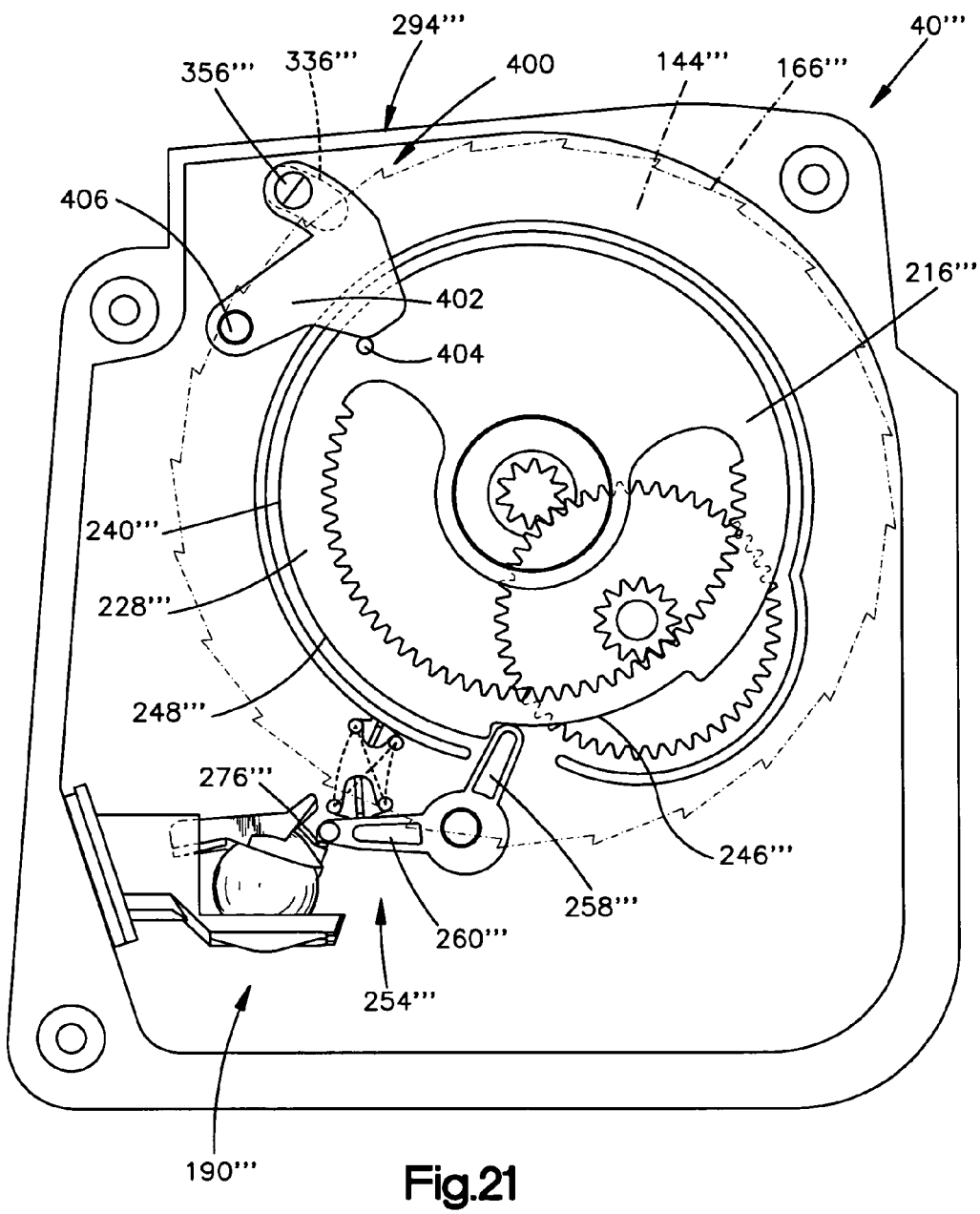
FIG. 21 is a schematic side view illustrating the retractor of FIG. 20 with parts in a different position.
Figure 22:
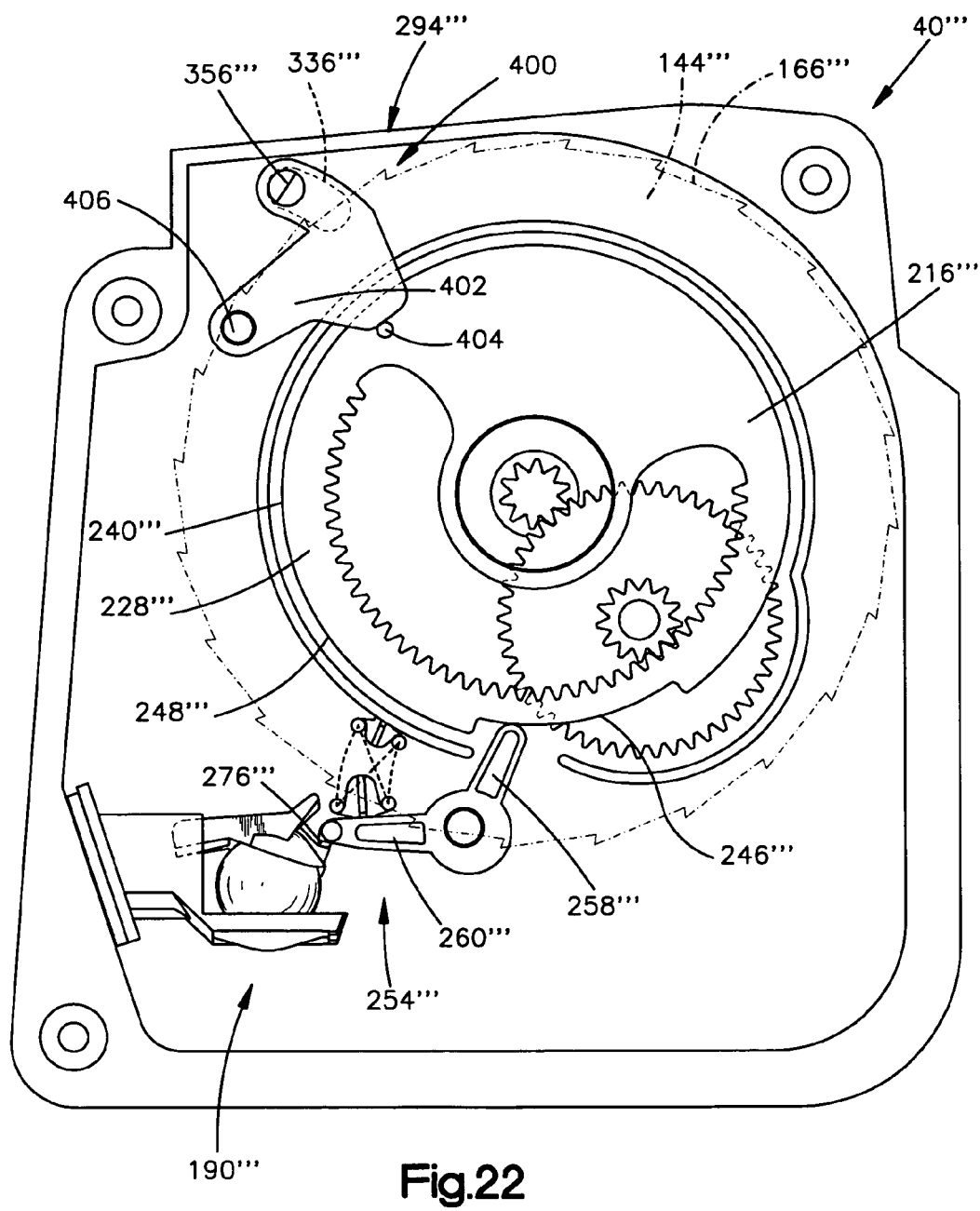
FIG. 22 is a schematic side view illustrating the retractor of FIG. 20 with parts in a different position.

Specifically, when the control lever 254''' is in the position shown in FIG. 19, the blocking arm 276''' of the second leg 260''' of the control lever 254''' allows pivotal movement of the sensor lever of the vehicle sensitive sensor (not shown), as in the embodiment of FIGS. 3-12. Thus, when in the position shown in FIG. 19, the control lever 254''' has not disabled the vehicle sensitive sensor. The vehicle sensitive sensor is disabled, instead, when the first leg 258''' of the control lever 254''' becomes located adjacent the first segment 246''' of the external surface 240''' of the peripheral portion 228''' of the ring gear 216''', as shown in FIGS. 21-22. The first leg 258''' of the control lever 254''' is adjacent the first segment 246''' of the external surface 240''' of the peripheral portion 228''' of the ring gear 216''', thus disabling the vehicle sensitive sensor, when the seat belt webbing is in or near a fully retracted condition on the spool of the retractor 40'''.

As the seat belt webbing is taken up by the retractor 40''' and the spool is rotated in a direction opposite the belt withdrawal direction as shown in FIGS. 19-22, the ring gear 216''' is rotated in a clockwise direction, as viewed in the orientation of FIGS. 19-22. During such rotation of the ring gear 216''', the first leg 258''' of the control lever 254''' moves along the second surface 248''' of the peripheral portion 228''' of the ring gear 216'''. When a predetermined amount of seat belt webbing has been retracted or taken up by the retractor 40''', the first leg 258''' of the control lever 254''' moves along the first segment 246''' of the external surface 240''' of the peripheral portion 228''' of the ring gear 216''', as is shown in FIGS. 21-22. The predetermined amount of seat belt webbing taken up when the first leg 258''' of the control lever 254''' transitions from the second segment 248''' to the first segment 246''' preferably is an amount of seat belt webbing made available by the reduced distance between the retractor 40''' and the anchor by the folding of the backrest portion toward the cushion portion of the seat.

Once this predetermined amount of seat belt webbing has been taken up, the backrest portion is in a folded position with no slack in the seat belt webbing and the seat back latch mechanism is unlatched. Because of the unlatched status of the seat belt latch mechanism, the pin 356''' is in engagement with the actuator teeth 166''' and the second mechanism 294''' of FIGS. 19-23 would normally prevent withdrawal of the seat belt webbing, thus effectively locking the backrest portion into the folded position. However, in this fourth embodiment, the third mechanism 400 of the retractor 40''' acts to override the second mechanism 294'''.

The override pin 404 is located on the ring gear 216''' at a location spaced from the first segment 246''', as shown in FIGS. 19-22. As the ring gear 216''' rotates in a direction opposite the belt withdrawal direction (clockwise, in FIGS. 19-22), the override pin 404 moves clockwise and into engagement with the override actuator 402, as is shown sequentially by FIGS. 19-22. The override actuator 402 is connected with the pin 356''' and pivots around an override pivot 406 in response to force applied by either the pin 356''' or the override pin 404. Before engagement with the override pin 404, the override actuator 402 is biased down toward the center of the ring gear 216''' because the connected pin 356''' is biased toward the lowermost end of the slot 336''' when the slider block 370 is in the second position through engagement with an unlatched seat back latch mechanism. The coupling 372''' of the second mechanism 190''' generally requires the pin 356''' to follow the motion of the slider block 370.

When the ring gear 216''' rotates in the direction opposite the belt withdrawal direction, the override pin 404 is brought into engagement with the override actuator 402. Since the override pin 404 is fixed on the ring gear 216''', the override actuator 402 is forced to pivot in a counterclockwise direction around the override pivot 406. The counterclockwise motion of the override actuator 402 pushes the pin 356''' upward in the slot 336''', as shown best in FIGS. 20-21, and out of engagement with the actuator teeth 166''' of the actuator disk 144'''.

When the pin 356''' moves upward in the slot 336, the slider block 370''' stays stationary because the latched/unlatched status of the seat back latch mechanism has not changed. Instead, first and second coupling springs 408 and 410 of the coupling 372 compress and stretch, respectively, from their original conditions and thus allow the pin rocker 374''' to rotate with respect to the slider block 370'''. The first and second coupling springs 408 and 410 resist being forced from their original, conditions and, through linkage with the pin rocker 374''', the pin 356''' is biased toward the lowermost portion of the slot 336''' when the slider block 370''' is in the second position. This downward bias is only overcome when the override actuator 402 engages with the override pin 404 due to motion of the ring gear 216''' when the backrest portion of the seat is folded forward in the fourth embodiment of the present invention, as shown in FIGS. 19-23.

The pin 356, 356', 356'', 356''' of any embodiment of the present invention may have a semicylindrical cross section for at least a portion of its length, as best shown in FIGS. 14 and 19-22. A non-rounded edge may help the pin 356 engage with the ratchet teeth 166 of the actuator disk 144 in a desired manner.

The control lever 254 may transition between any number of intermediate positions between the position shown in FIG. 6 and the position shown in FIG. 12. For example, the control lever 254 may be movable into a neutral position in which the control lever 254 has no effect on either the vehicle sensitive sensor 190 or the spool 106.

From the above description of the invention, those skilled in the art will perceive improvements, changes and modifications. For example, the mechanism 294 for preventing rotation of the spool 106 in the belt withdrawal direction when the seat back latch mechanism 26 is in the unlatched condition may be electronically actuated. Instead of the inner cable 300 moving an actuator 306 to move the slide portion 322 of the mechanism 294, a device, such as a solenoid, may be actuated for moving the slide portion 322 of the mechanism 294. A sensor (not shown) may be associated with the seat back latch mechanism 26 for providing a signal to control the device. The first, second, and third mechanisms 190, 294, and 400, respectively, may be used in any desirable combination and do not all need to be used in the same retractor 40. Such improvements, changes and modifications within the skill of the art are intended to be covered by the appended claims.

Having describe the invention, the following claimed is:

1. A seat belt retractor associated with a seat of a vehicle, the retractor comprising:

a spool about which seat belt webbing is wound, the spool being supported for rotation in a belt withdrawal direction and in an opposite belt retraction direction;

a vehicle sensitive sensor that is responsive to at least one sensed vehicle condition for preventing rotation of the spool in the belt withdrawal direction;

a first mechanism, the first mechanism being responsive to a first condition for disabling the vehicle sensitive sensor by preventing the vehicle sensitive sensor from preventing rotation of the spool in the belt withdrawal direction in response to the at least one sensed vehicle condition; and a second mechanism, the second mechanism being responsive to a second, different condition for preventing rotation of the spool in the belt withdrawal direction, the second condition being a condition of the associated seat.

2. The seat belt retractor of claim 1 wherein the first and second mechanisms share a common component for disabling the vehicle sensitive sensor and for preventing rotation of the spool in the belt withdrawal direction.

3. The seat belt retractor of claim 1 wherein the second mechanism is actuatable in response to the second condition, the second condition occurring when a seat back latch mechanism for fixing a backrest portion of the associated seat relative to a cushion portion of the associated seat is in an unlatched condition.

4. The seat belt retractor of claim 3 wherein the first condition occurs when seat belt webbing is wound onto the spool to, near, or above a fully retracted condition.

5. The seat belt retractor of claim 1 wherein the retractor includes an actuator disk having ratchet teeth, the second mechanism including structure for engaging a ratchet tooth of the actuator disk to prevent rotation of the actuator disk and thereby, prevent rotation of the spool in the belt withdrawal direction.

6. The seat belt retractor of claim 5 wherein the structure of the second mechanism comprises a pin associated with a slider assembly, the pin moving into engagement with a ratchet tooth of the actuator disk in response to the second condition.

7. The seat belt retractor of claim 6 wherein the slider assembly includes an actuator and a slider portion, movement of the actuator causing movement of the slider portion, the movement of the slider portion moving the pin into engagement with the actuator disk.

8. The seat belt retractor of claim 7 wherein a seat back latch mechanism of the associated seat has a latched condition for fixing a backrest portion of the associated seat relative to a cushion portion of the associated seat and an unlatched condition in which the backrest portion is movable relative to the cushion portion, the second condition being the unlatched condition of the seat back latch mechanism.

9. The seat belt retractor of claim 8 wherein a control cable couples the seat back latch mechanism to the actuator of the second mechanism, the control cable being responsive to movement of the seat back latch mechanism between the latched and unlatched conditions for moving the actuator.

10. The seat belt retractor of claim 5 wherein the structure of the second mechanism comprises a control lever, the control lever pivoting into engagement with a ratchet tooth of the actuator disk in response to the second condition.

11. The seat belt retractor of claim 10 wherein, in response to the second condition, a pin of a slider mechanism of the second mechanism engages the control lever, engagement of the pin and the control lever affecting the pivotal movement of the control lever so that the control lever engages the actuator disk to prevent rotation of the spool in the belt withdrawal direction.

12. The seat belt retractor of claim 11 wherein the control lever prevents rotation of the spool in the belt withdrawal direction only when the second condition occurs in an absence of the first condition.

13. The seat belt retractor of claim 12 wherein a seat back latch mechanism of the associated seat has a latched condition for fixing a backrest portion of the associated seat relative to a cushion portion of the associated seat and an unlatched condition in which the backrest portion is movable relative to the cushion portion, the second condition being the unlatched condition of the seat back latch mechanism.

14. The seat belt retractor of claim 1, including a third mechanism being responsive to-the first condition for allowing rotation of the spool in the belt withdrawal direction.

15. The seat belt retractor of claim 14 wherein the second and third mechanisms share a common component for controlling rotation of the spool in the belt withdrawal direction.

16. The seat belt retractor of claim 14 wherein the second mechanism is actuatable in response to the second condition, the second condition occurring when a seat back latch mechanism for fixing a backrest portion of the associated seat relative to a cushion portion of the associated seat is in an unlatched condition.

17. The seat belt retractor of claim 16 wherein a control cable couples the seat back latch mechanism to the second mechanism of the retractor, the control cable actuating the second mechanism to prevent rotation of the spool in the belt withdrawal direction in response to movement of the seat back latch mechanism into the unlatched condition.

18. The seat belt retractor of claim 14 wherein the first condition occurs when seat belt webbing is wound onto the spool to, near, or above a fully retracted condition.

19. The seat belt retractor of claim 14 wherein the retractor includes an actuator disk having ratchet teeth, the third mechanism including structure for selectively engaging a ratchet tooth of the actuator disk to control rotation of the actuator disk and thereby control rotation of the spool in the belt withdrawal direction.

20. The seat belt retractor of claim 19 wherein the structure for selectively engaging is a pin and the third mechanism also includes an override actuator, movement of the override actuator causing movement of the pin, the movement of the override actuator moving the pin out of engagement with the actuator disk.

21. A seat belt retractor associated with a seat of a vehicle, the retractor comprising:
a spool about which seat belt webbing is wound, the spool being supported for rotation in a belt withdrawal direction and in an opposite belt retraction direction;
a vehicle sensitive sensor that is responsive to at least one sensed vehicle condition for preventing rotation of the spool in the belt withdrawal direction;
a first mechanism, the first mechanism being responsive to a first condition for disabling the vehicle sensitive sensor; and
a second mechanism, the second mechanism being responsive to a second, different condition for preventing rotation of the spool in the belt withdrawal direction, the second condition being a condition of the associated seat;
the first and second mechanisms sharing a common component for disabling the vehicle sensitive sensor and for preventing rotation of the spool in the belt withdrawal direction, the common component comprising a control lever that is selectively movable into a first position for disabling the vehicle sensitive sensor, into a second position for preventing rotation of the spool in the belt withdrawal direction, and into a neutral position in which the control lever has no effect on the vehicle sensitive sensor or the spool.

22. The seat belt retractor of claim 21 wherein the control lever is movable into the second position for preventing rotation of the spool in the belt withdrawal direction only in an absence of the first condition.

23. The seat belt retractor of claim 22 wherein the first condition occurs when seat belt webbing is wound onto the spool to, near, or above a fully retracted condition.

24. The seat belt retractor of claim 21 wherein the control lever is being pivotable, the control lever pivoting into the first position when seat belt webbing is wound onto the spool to a near fully retracted condition, the control lever pivoting into the second position when a backrest portion of the associated seat is movable relative to a cushion portion of the associated seat.

25. The seat belt retractor of claim 24 wherein the associated seat includes a seat back latch mechanism having a latched condition for fixing the backrest portion relative to the cushion portion and an unlatched condition in which the backrest portion is movable relative to the cushion portion.

26. The seat belt retractor of claim 25 wherein a control cable couples the seat back latch mechanism to the second mechanism of the retractor, the control cable actuating the second mechanism to prevent rotation of the spool in the belt withdrawal direction in response to movement of the seat back latch mechanism into the unlatched condition.

27. A seat belt retractor for mounting within a backrest portion of a seat of a vehicle, the backrest portion of the seat being movable relative to a cushion portion when a seat back latch mechanism is in an unlatched condition, the retractor comprising:
a spool about which seat belt webbing is wound, the spool being supported for rotation in a belt withdrawal direction and in an opposite belt retraction direction;
a vehicle sensitive sensor that is responsive to at least one sensed vehicle condition for preventing rotation of the spool in the belt withdrawal direction;
a first mechanism, the first mechanism being responsive to seat belt webbing being wound onto the spool to, near, or above a fully retracted condition for disabling the vehicle sensitive sensor; and
a second mechanism, the second mechanism being responsive to the seat back latch mechanism being in the unlatched condition for preventing rotation of the spool in the belt withdrawal direction.

28. The seat belt retractor of claim 27, including a third mechanism, the third mechanism being responsive to seat belt webbing being wound onto the spool to a nearly fully retracted condition for allowing rotation of the spool in the belt withdrawal direction.

* * * * *

UNITED STATES PATENT AND TRADEMARK OFFICE
CERTIFICATE OF CORRECTION

PATENT NO. : 7,637,536 B2 Page 1 of 1
APPLICATION NO. : 11/384802
DATED : December 29, 2009
INVENTOR(S) : Delventhal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this

Ninth Day of November, 2010

David J. Kappos
*Director of the United States Patent and Trademark Office*